United States Patent [19]
Reuter

[11] 3,937,521
[45] Feb. 10, 1976

[54] SELF-PURGING PNEUMATIC CONVEYING APPARATUS AND VARIED MEANS OF OPERATION

[75] Inventor: Brian R. Reuter, Houston, Tex.

[73] Assignee: Consolidated Engineering Company, Houston, Tex.

[22] Filed: Dec. 3, 1973

[21] Appl. No.: 421,450

Related U.S. Application Data

[63] Continuation-in-part of Ser. No. 98,567, Dec. 16, 1970, Pat. No. 3,776,599, which is a continuation-in-part of Ser. No. 822,126, May 6, 1969, Pat. No. 3,549,206, which is a continuation-in-part of Ser. No. 686,018, Nov. 28, 1967, abandoned, which is a continuation-in-part of Ser. No. 518,353, Jan. 3, 1966, Pat. No. 3,355,211.

[52] U.S. Cl. .................... 302/3; 34/60; 34/221; 302/53; 432/58
[51] Int. Cl.² .................................. B65G 53/00
[58] Field of Search ............... 34/60, 61, 218, 221; 302/3, 53; 432/58

[56] References Cited
UNITED STATES PATENTS

| | | | |
|---|---|---|---|
| 1,538,115 | 5/1925 | Hoving | 302/3 X |
| 2,716,289 | 8/1955 | Lauck | 34/221 X |
| 3,355,221 | 11/1967 | Reuter | 302/53 |
| 3,408,746 | 11/1968 | Reynolds et al. | 34/221 X |
| 3,425,503 | 2/1969 | Bullivant et al. | 73/141 R |
| 3,727,985 | 4/1973 | Reuter | 302/53 X |
| 3,776,599 | 12/1973 | Reuter | 302/53 X |

FOREIGN PATENTS OR APPLICATIONS

| | | | |
|---|---|---|---|
| 1,111,404 | 2/1956 | France | 34/221 |

*Primary Examiner*—Evon C. Blunk
*Assistant Examiner*—Jeffrey V. Nase

[57] ABSTRACT

The disclosure, for classification, is to a pressure vessel with fill valve admitting thereinto material to drop into a perforate diaphragm to be transferred, vacuum pulling in the material upon the perforate membrane or diaphragm, to upstand thereabove, the gas plenum below the diaphragm having activating gas inlet valve means communicating therewith and opened at intervals temporarily to break the vacuum. When a batch of material has been drawn in, the fill valve and the vacuum (and air break) valves are automatically closed, the activating gas inlet valve is opened to admit activating gas, as compressed air, to pass upwardly through diaphragm and activate the material to a highly flowable state. A discharge valve is then opened to let the pressurized material flow out through a discharge line to point of transfer. As the pressure in material plenum drops, the discharge valve is closed, the activating gas valve is closed, and a purge valve in a by-pass line, around the discharge valve, is opened, and residual pressure purges the residual material as this pressure falls substantially to atmospheric, for a succeeding cycle to begin. The disclosure is also to pressure vessels where the material drops onto the diaphragm via gravity when the fill valve opens, such vessels also being mounted on load cells equipped to emanate a pressure signal in correspondence with the weight of material admitted into the pressure vessel. Also, the disclosure is to pressure vessels equipped with circuitry controlled drier apparatus. Additionally, for all forms, variations of circuitry are shown whereby various steps may be controlled by at least one of pressure, time, level probe position, weight and limit switch position.

9 Claims, 29 Drawing Figures

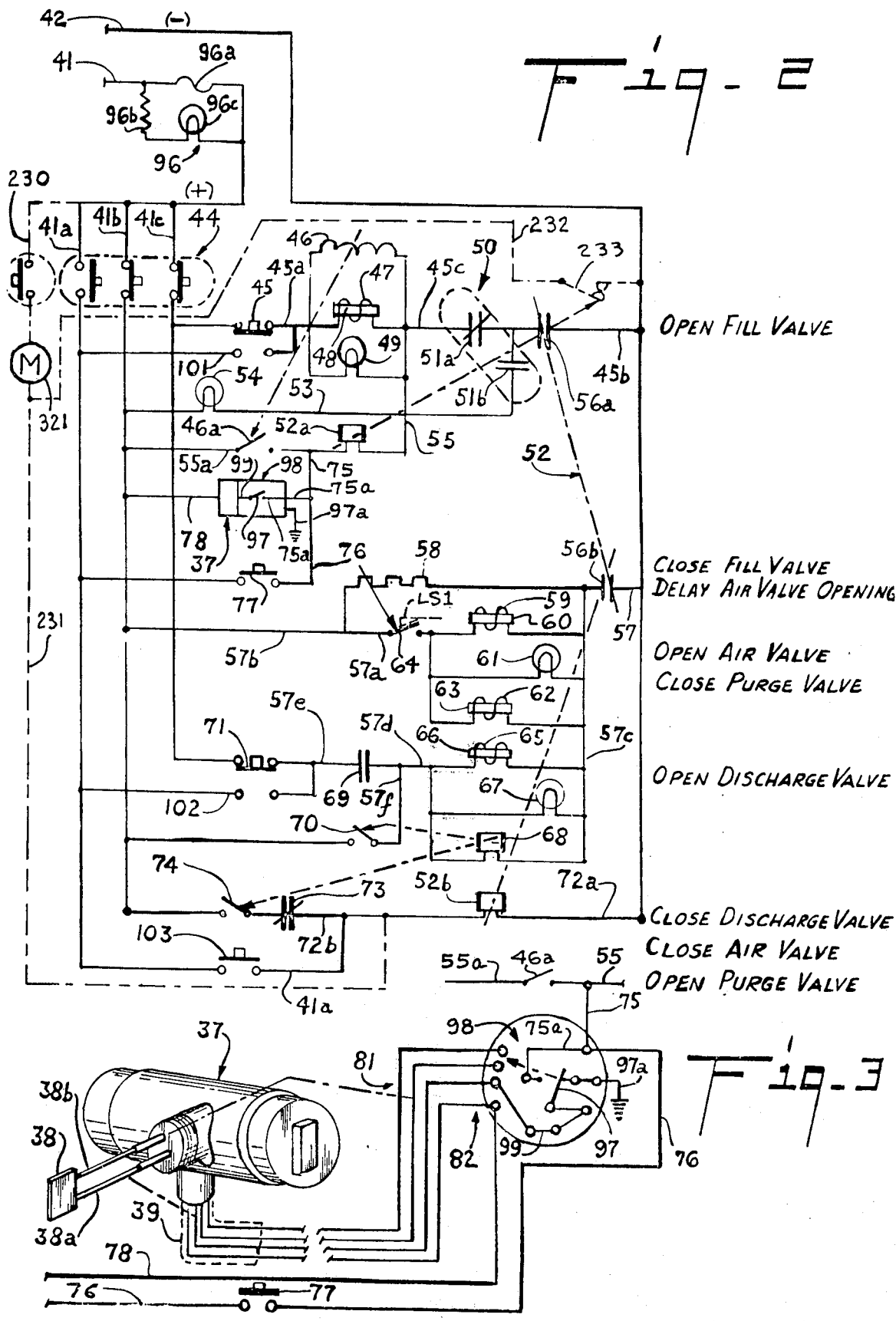

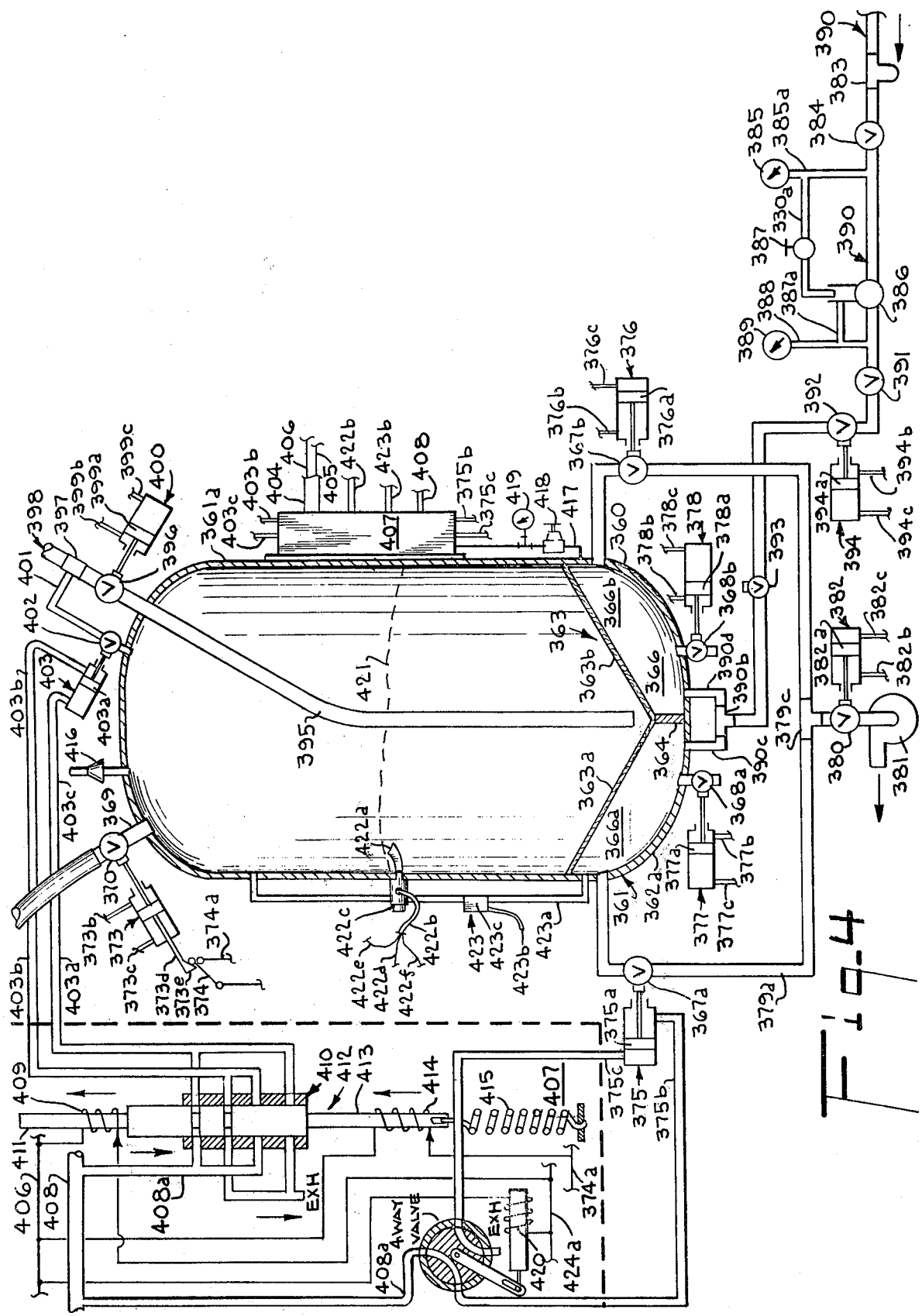

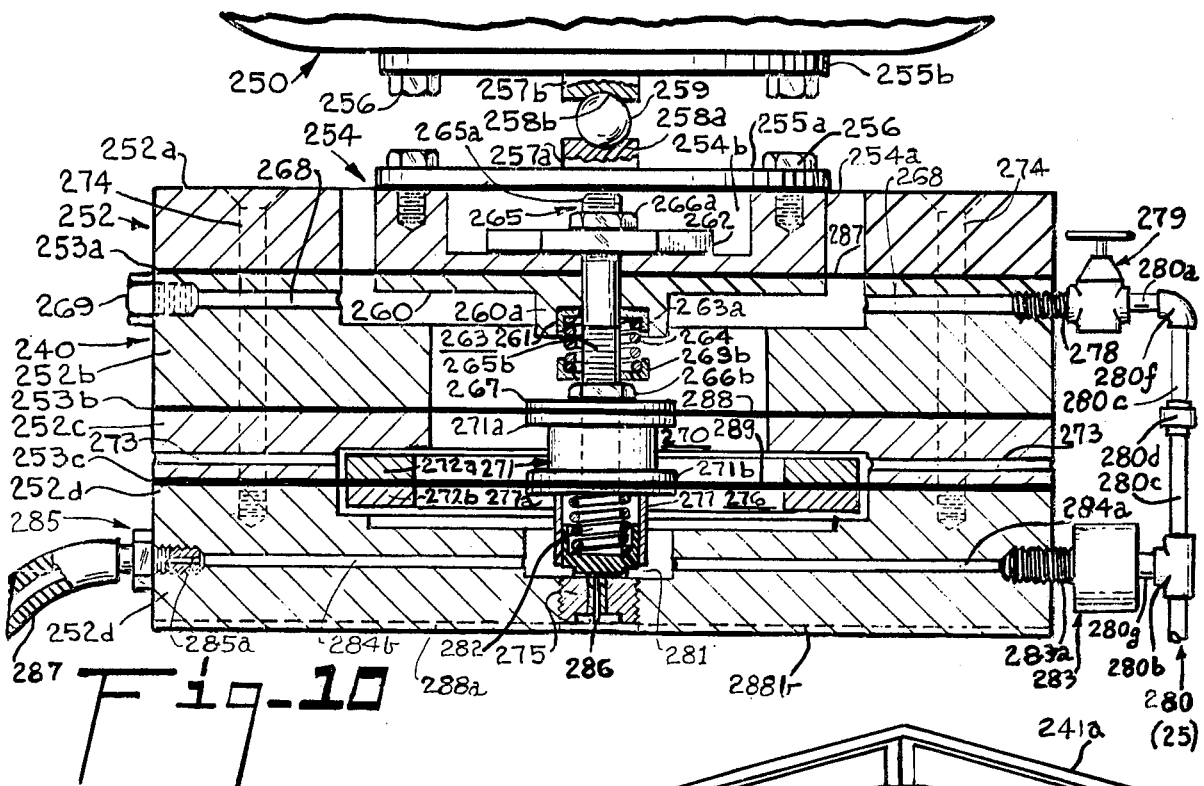
Fig-10
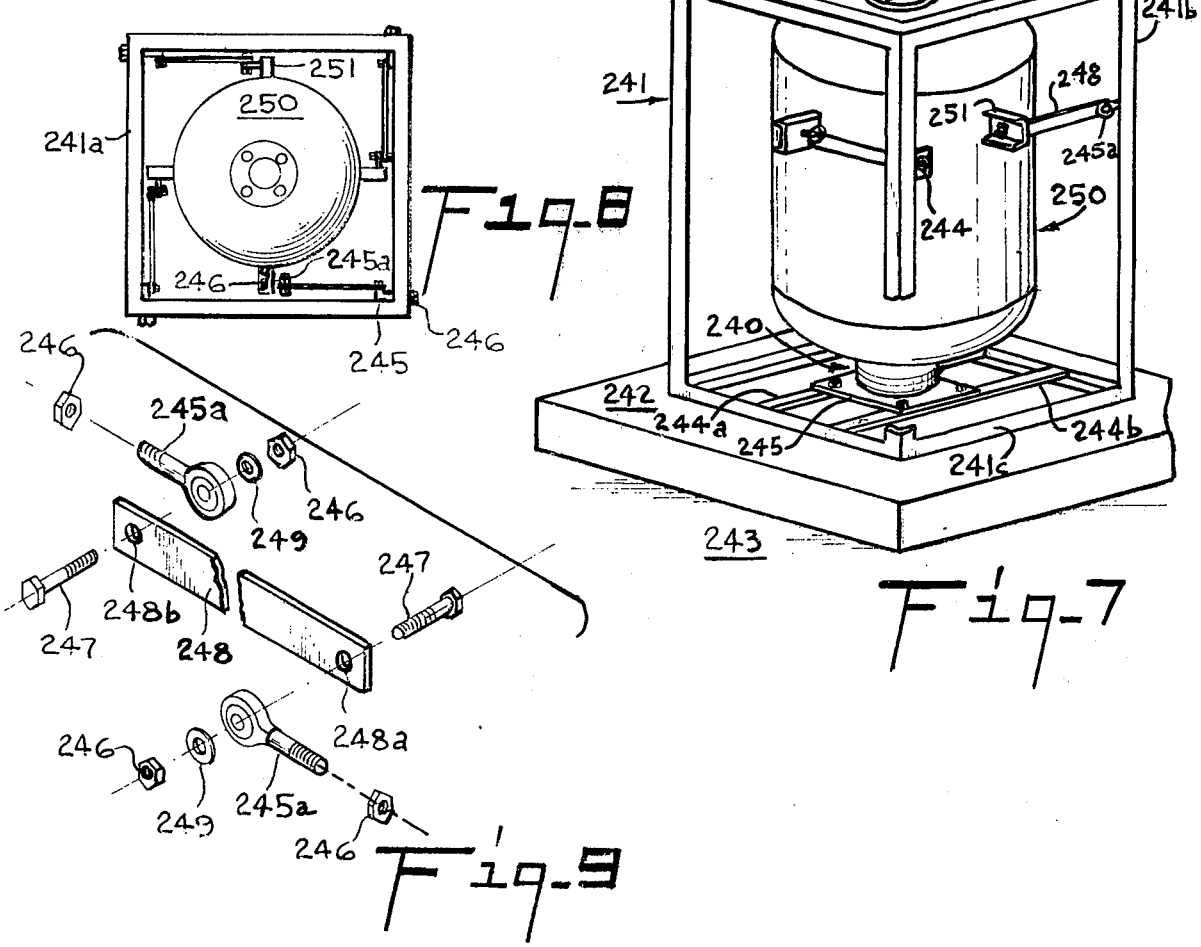
Fig-8
Fig-7
Fig-9

OPEN FILL VALVE

CLOSE FILL VALVE
DELAY AIR VALVE OPENING

OPEN AIR VALVE
CLOSE PURGE VALVE

OPEN DISCHARGE VALVE

CLOSE DISCHARGE VALVE
CLOSE AIR VALVE
OPEN PURGE VALVE

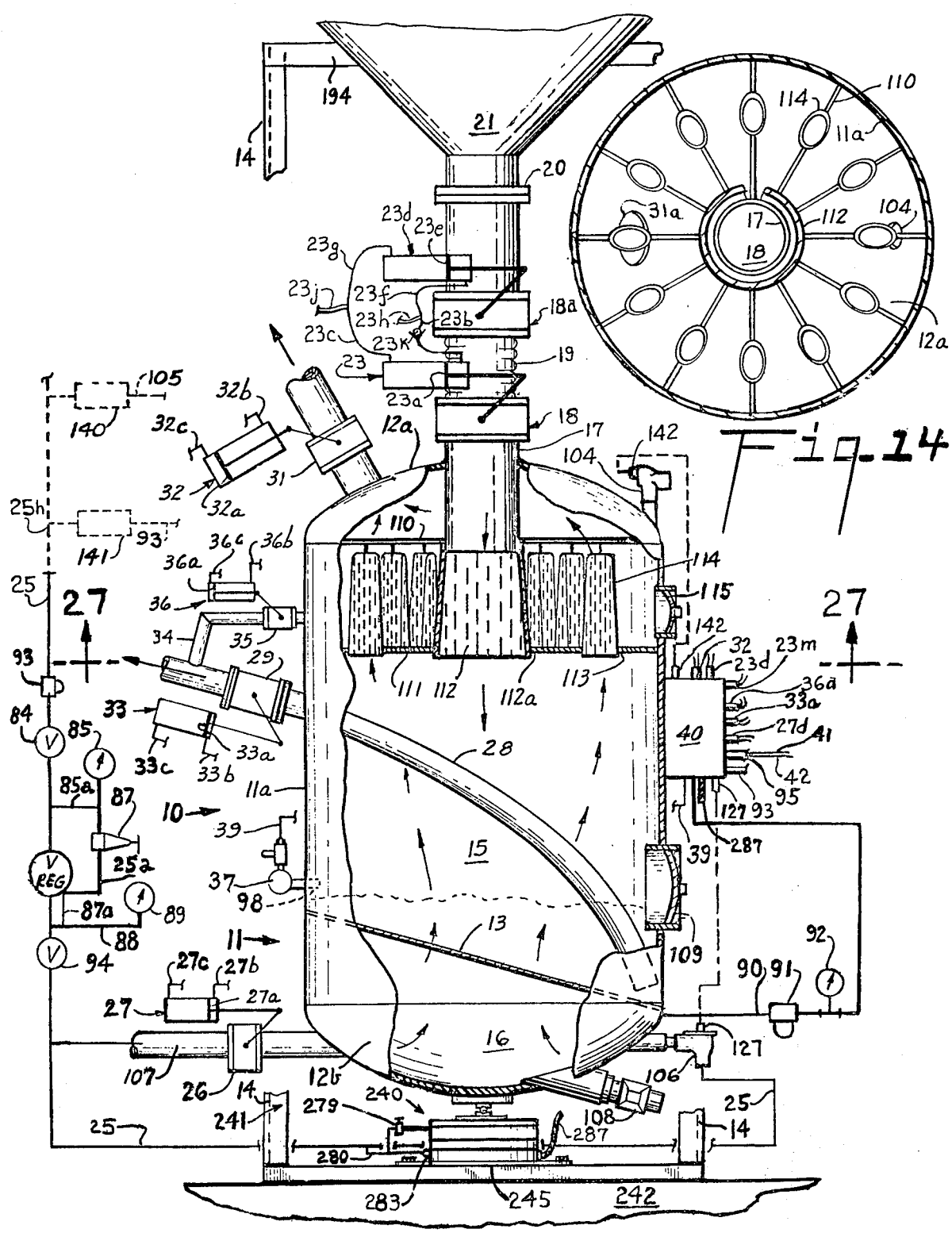

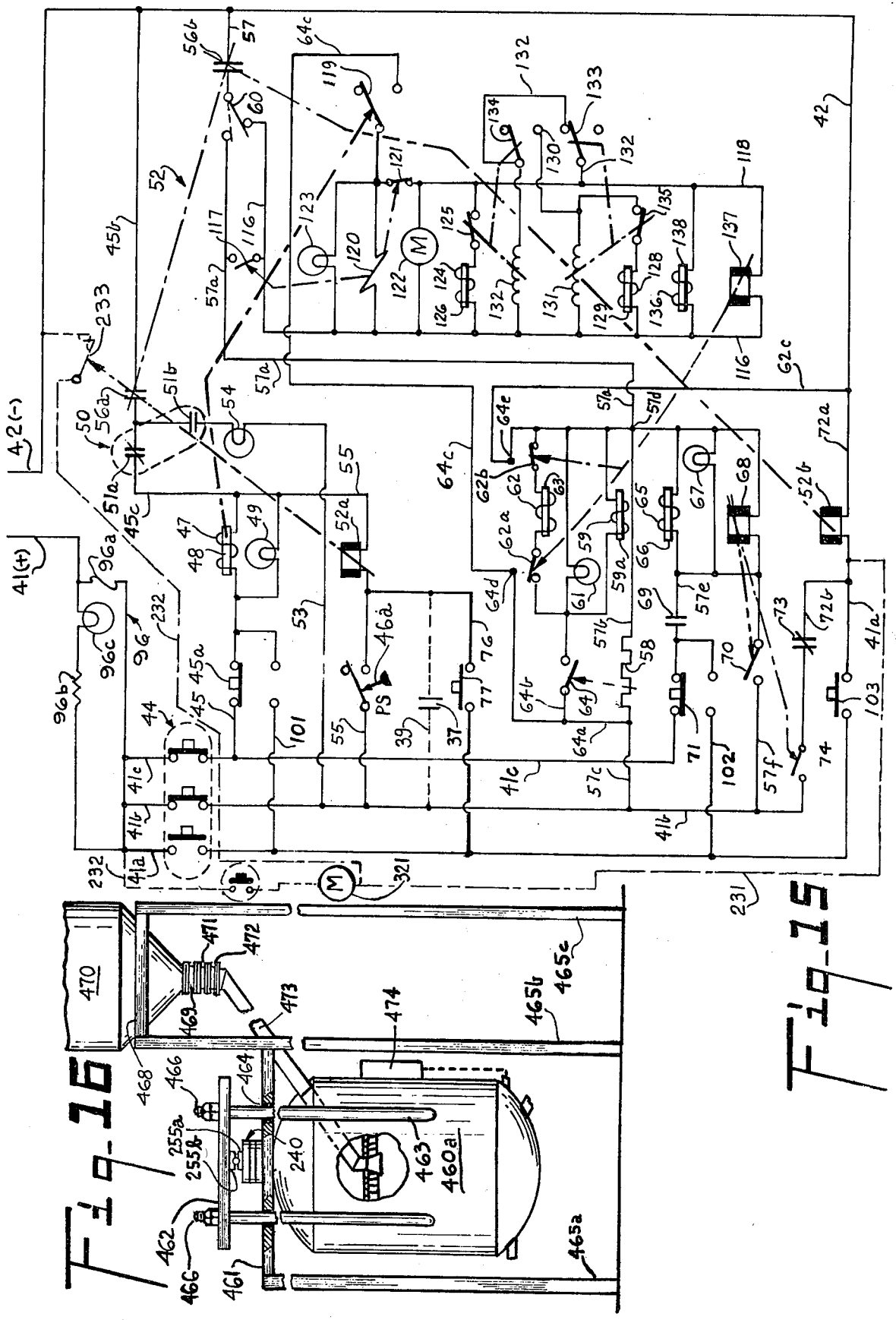

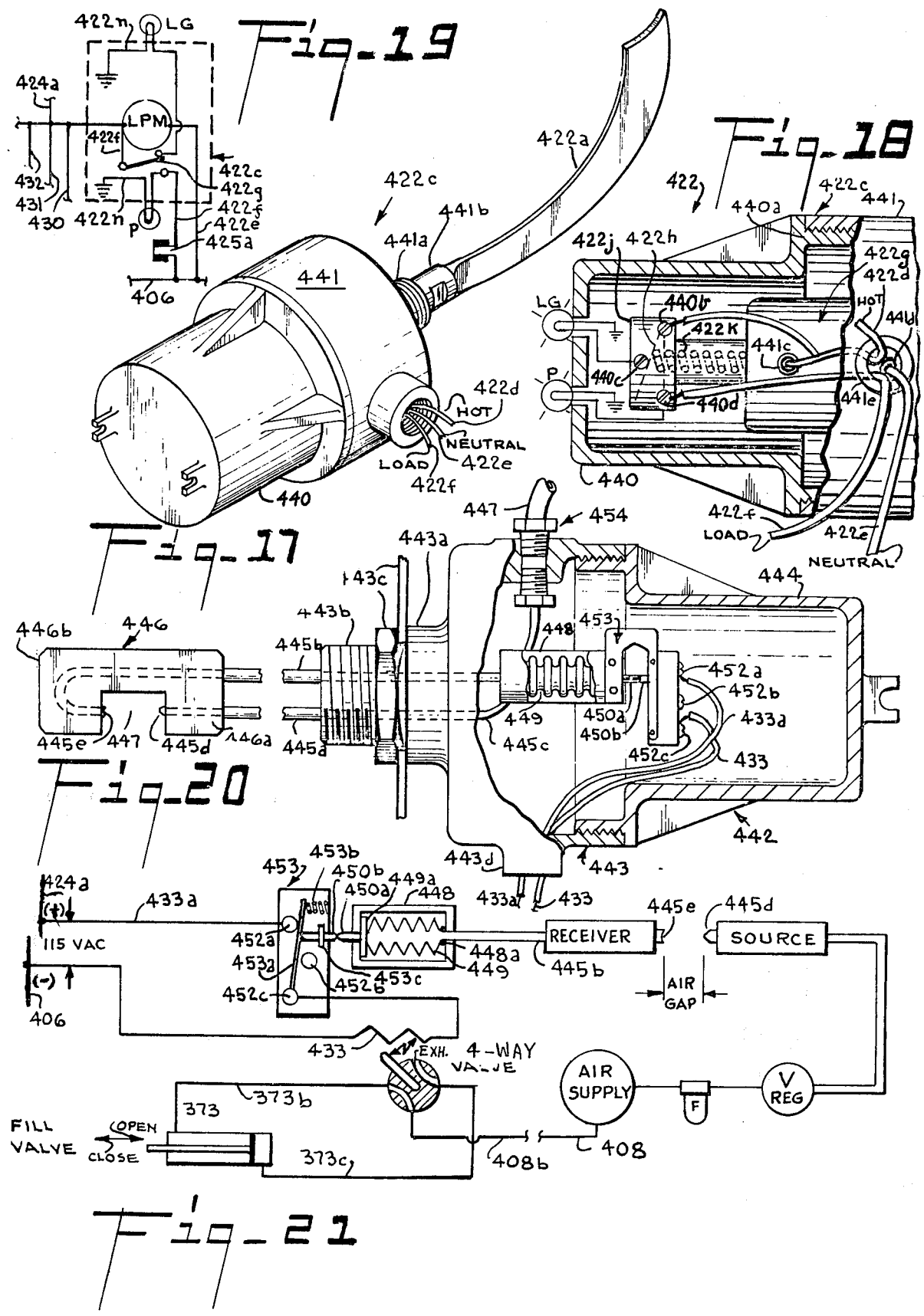

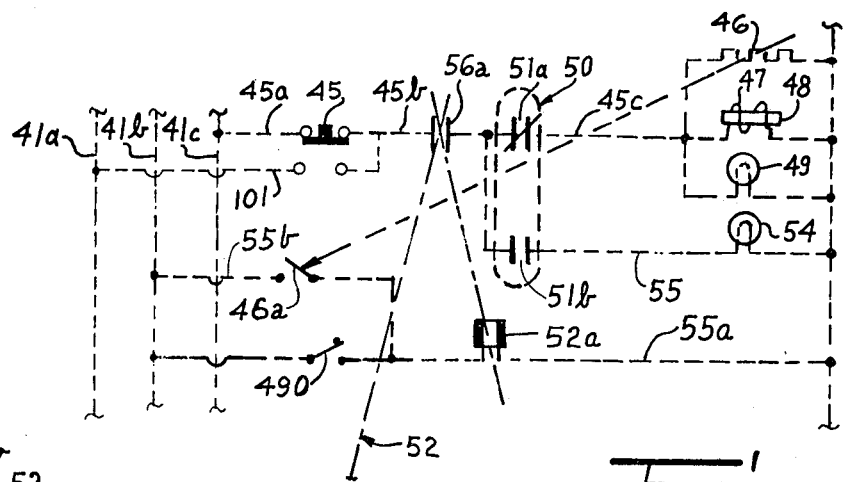
Fig. 29
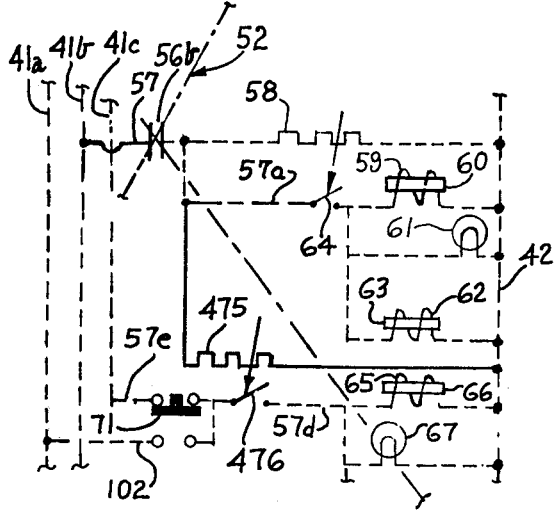
Fig. 22
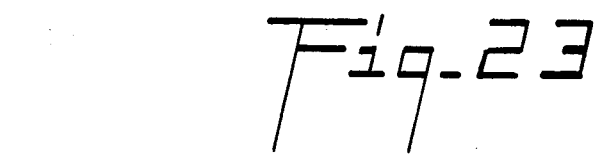
Fig. 23
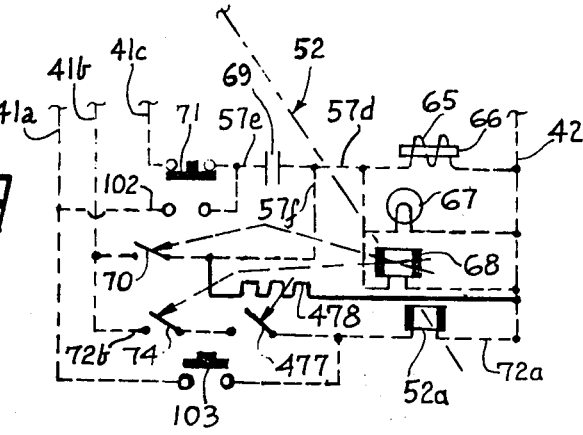
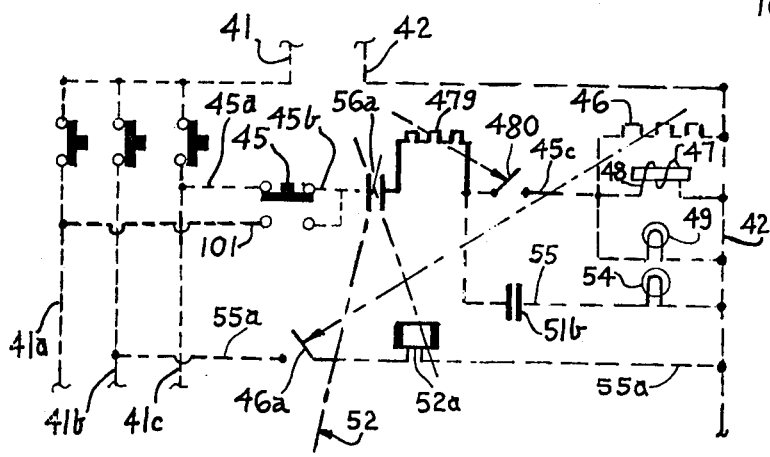
Fig. 24

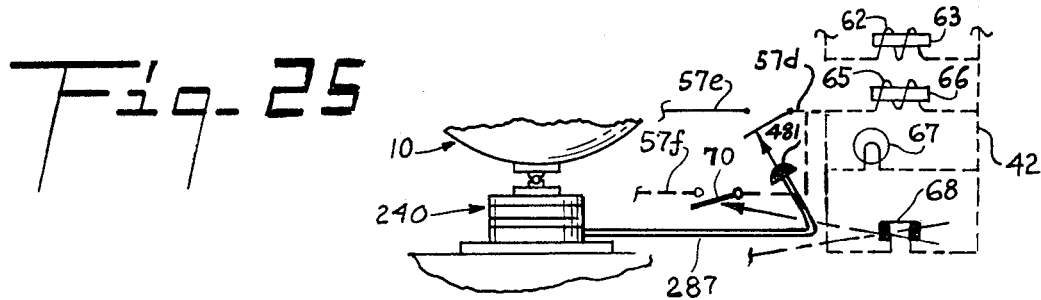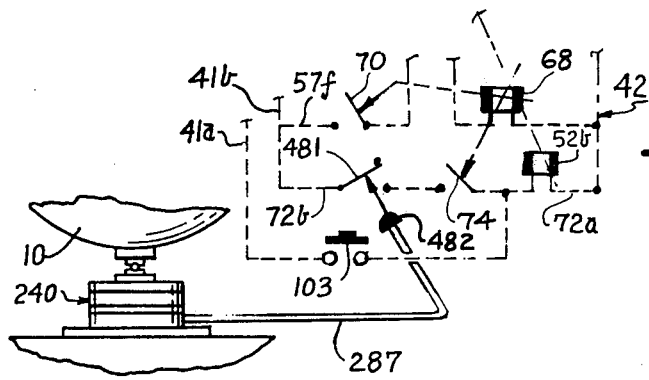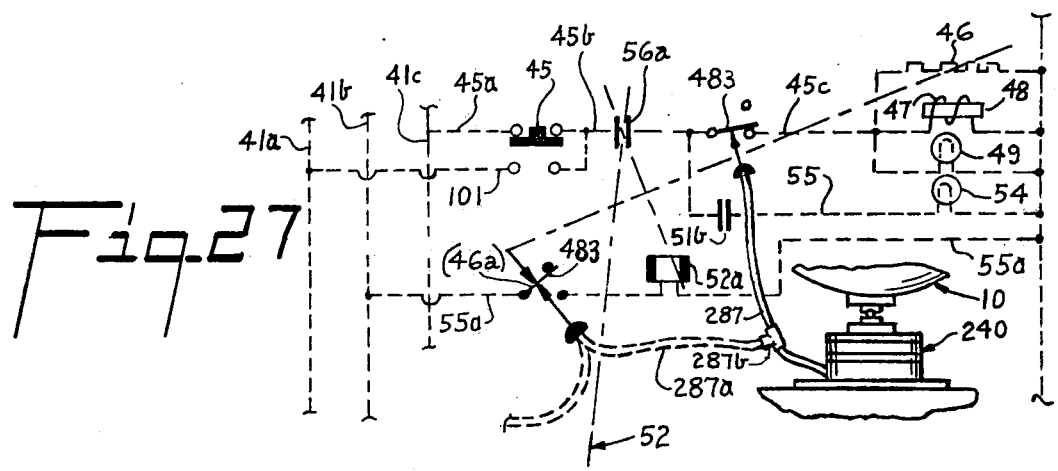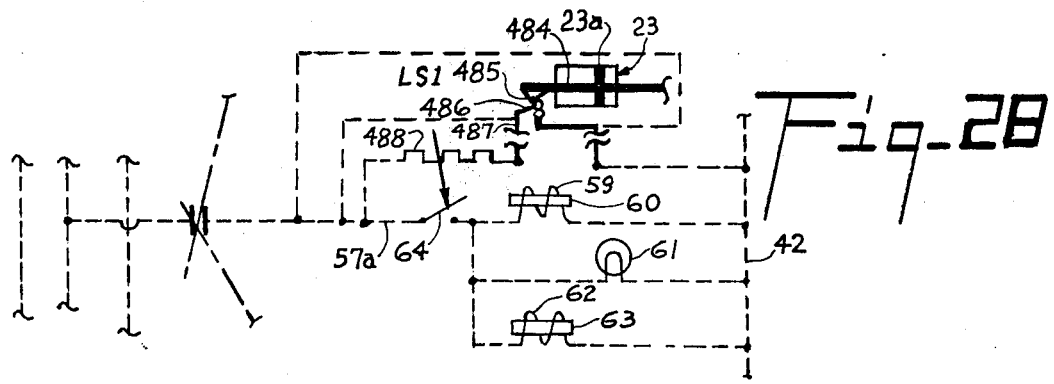

SELF-PURGING PNEUMATIC CONVEYING APPARATUS AND VARIED MEANS OF OPERATION

CROSS REFERENCE TO RELATED APPLICATIONS

This application is a continuation-in-part of application Ser. No. 98,567, filed Dec. 16, 1970 now U.S. Pat. No. 3,776,599, which is a continuation-in-part of application Ser. No. 822,126, filed May 6, 1969, now U.S. Pat. No. 3,549,206, which is a continuation-in-part of Ser. No. 686,018, filed Nov. 28, 1967, now abandoned, which is a continuation-in-part of Ser. No. 518,353, filed Jan. 3, 1966, now U.S. Pat. No. 3,355,211. Other related application are Ser. No. 868,078, now U.S. Pat. No. 3,632,173, which is a continuation-in-part of Ser. No. 822,126, now U.S. Pat. No. 3,549,206 and Ser. No. 214,668, now U.S. Pat. No. 3,727,985.

SUMMARY OF THE INVENTION

The inventions relate generally to various fluid flow pump combinations based upon the cycle of material deposit through fill valve on diaphragm, pressurized gas passage through perforate diaphragm to activate material, discharge of pressurized material down discharge line, purge of residual material by residual pressure through a by-pass line around closed discharge valve, pressurized gas valve also being closed; and the reopening of fill valve at start of a succeeding cycle as the vessel pressure falls substantially to atmospheric pressure.

It is a primary object of the invention to provide a pressure vessel automatically operable on successive fill, activate, discharge and purge step cycle, in which the material is drawn in through the fill valve to deposit under vacuum pull upon the diaphragm, with the vacuum being studiedly interrupted at predetermined brief time intervals.

It is also an object of the invention to provide a fluid flow pump of the class described in U.S. Pat. No. 3,355,221, in which the vessel is supported by a load cell type scale with a compressed air signal from the tare weight adjusted load cell controlling fill valve operation.

It is another object of the invention to provide a fluid flow pump of the class described, in which the closure of the fill valve may be actuated by material level effect upon a probe disposed above the diaphragm and of at least one of vibration sensitive, revolved blade stoppage, and air gap occlusion types.

It is a further object of the invention to provide a fluid flow pump of the class described, equipped with material drying apparatus to dry material prior to discharge, and in which the pressure vessel is supported by a tare weight adjusted scale connected to actuate fill valve closure by a pressure signal reflecting batch weight.

It is yet another object of the invention to provide a fluid flow pump of the class described equipped with material drying apparatus to dry apparatus prior to discharge, and in which the pressure vessel is equipped with an agitator.

It is still a further object of the invention to provide pressure vessels of the various types, as basic fluid flow pump, vacuum filled pressure vessel, and drier equipped pressure vessels, as hereinabove described, which are supported by tare weight adjusted scale means, as a load cell type scale, by suspension therefrom.

Also it is a further object of the invention to provide fluid flow pump pressure vessels of the various types hereinabove disclosed in which circuitry changes may be made to accomplish various steps by various means, as fill valve closure by level probe position, discharge valve opening by a timer, discharge valve and activating gas valve closure and purge valve opening by timer, fill valve opening by timer, discharge valve opening by load cell signal, discharge valve and activating gas valve closure and purge valve opening by load cell signal, fill valve opening by load cell signal, fill valve closure by pressure fluid signal from the top of the pressure vessel, and activating gas valve opening by fill valve operator limit switch.

BRIEF DESCRIPTION OF THE DRAWINGS

Other and further objects will be apparent when the specification herein is considered in relation to the drawings, in which the figures of the continued part of the application are first described, as follows:

FIG. 2 is an electrical diagram of circuitry and apparatus employed in the operation of the form of the invention shown in FIG. 1.

FIG. 3 is an isometric view, partially diagrammatic, of a vibration type level sensor or probe, employable as an alternative means of controlling or safeguarding fill valve closure in the various forms of the invention shown, or to be shown herein;

FIG. 4 is a sectional elevational view, including apparatus diagram, of a preferred form of fluid flow pump, as shown in FIG. 1, in which the material to be transferred is drawn into the pump or vessel by vacuum;

FIG. 7 is an isometric view of a fluid flow pump, as shown in FIG. 6, mounted to be weighed on a preferred type of load cell, which emits a weight responsive pressure signal to actuate fill valve closure;

FIG. 8 is a plan view of the fluid flow pump shown in FIG. 7;

FIG. 9 is an isometric, development view, of parts indicated in FIGS. 7 and 8, for removably connecting the fluid flow pump to the scaffold or mounting frame shown in such figures;

FIG. 10 is a sectional elevational view, partially diagrammatic, through a load cell shown isometrically below the fluid flow pump in FIG. 6;

FIG. 13 is an elevational view, part in section, of a pressure vessel, partially diagrammatical, which discloses a material drying and conveying embodiment of the invention;

FIG. 14 is a sectional bottom view, looking upward along line 14—14 of FIG. 13;

FIG. 15 is an electrical diagram of the apparatus and circuitry as employed in the actuation of the apparatus, including drying apparatus actuating circuitry interposed between steps for fluid flow pump function actuation;

FIG. 16 is a small scale elevational view of a form of the invention including a load cell suspended fluid flow pump equipped with drying apparatus;

FIG. 17 is an isometric view, partially diagrammatic, of a rotated paddle or knife type level sensor or probe, employable preferably in place of the level sensor shown in FIG. 3, or shown in FIGS. 1 and 6, to be hereinbelow described, as an alternative means of controlling or safeguarding fill valve closure;

FIG. 18 is a fragmentary sectional elevational view, partially diagrammatic, showing the rotated paddle type probe connections, including connections within the sensor housing;

FIG. 19 is an electrical diagram of the circuitry for the form of sensor or probe shown in FIGS. 17 and 18;

FIG. 20 is an elevational view, part in section, of an air gap type level sensor or probe, employable alternatively in place of the level sensor or probe shown in FIGS. 1, 3, and 6.

FIG. 21 is a diagrammatical view of apparatus, circuitry, and connection means therefor, as entailed in operation of the air gap type level probe or sensor shown in FIG. 20;

FIG. 22 is a fragmentary circuit diagram showing circuitry for any of the aforesaid pressure vessels altered for discharge valve opening by time actuated circuitry;

FIG. 23 is a fragmentary circuit diagram showing circuitry for any of the aforesaid pressure vessels altered for discharge valve and gas inlet valve closing and purge valve opening by time actuated circuitry;

FIG. 24 is a fragmentary circuit diagram, showing circuitry for any of the aforesaid pressure vessels altered for fill valve opening by time actuated circuitry;

FIG. 25 is a fragmentary circuit diagram showing circuitry for any of the aforesaid pressure vessels altered for opening the discharge valve by a fluid pressure signal actuated responsive to material and gas weight in pressure vessel;

FIG. 26 is a fragmentary circuit diagram showing circuitry for any of the aforesaid pressure vessels altered for closing the discharge valve and the gas inlet valve for opening the purge valve by a fluid pressure signal actuated responsive to material and gas weight in pressure vessel;

FIG. 27 is a fragmentary circuit diagram showing circuitry for any of the aforesaid pressure vessels altered for opening the fill valve by a fluid pressure signal actuated responsive to depletion of material and gas weight in pressure vessel; the diagram also indicating that an early such signal actuated from a different source, the top of the pressure vessel, may serve alternatively for closing the fill valve;

FIG. 28 is a fragmentary circuit diagram showing circuitry involved in opening the gas inlet valve by a time cycle only after closing the fill valve by limit switch action; and FIG. 29 is a fragmentary circuitry diagram, showing any of the level probes shown in FIG. 3, in FIGS. 17–19, and in FIGS. 20–21, serving in any of the hereinabove described pressure vessel operative structures, to close the fill valve upon receipt of batch load.

DESCRIPTION OF THE INVENTIONS—STRUCTURES AND CIRCUITRY

Figure 1:
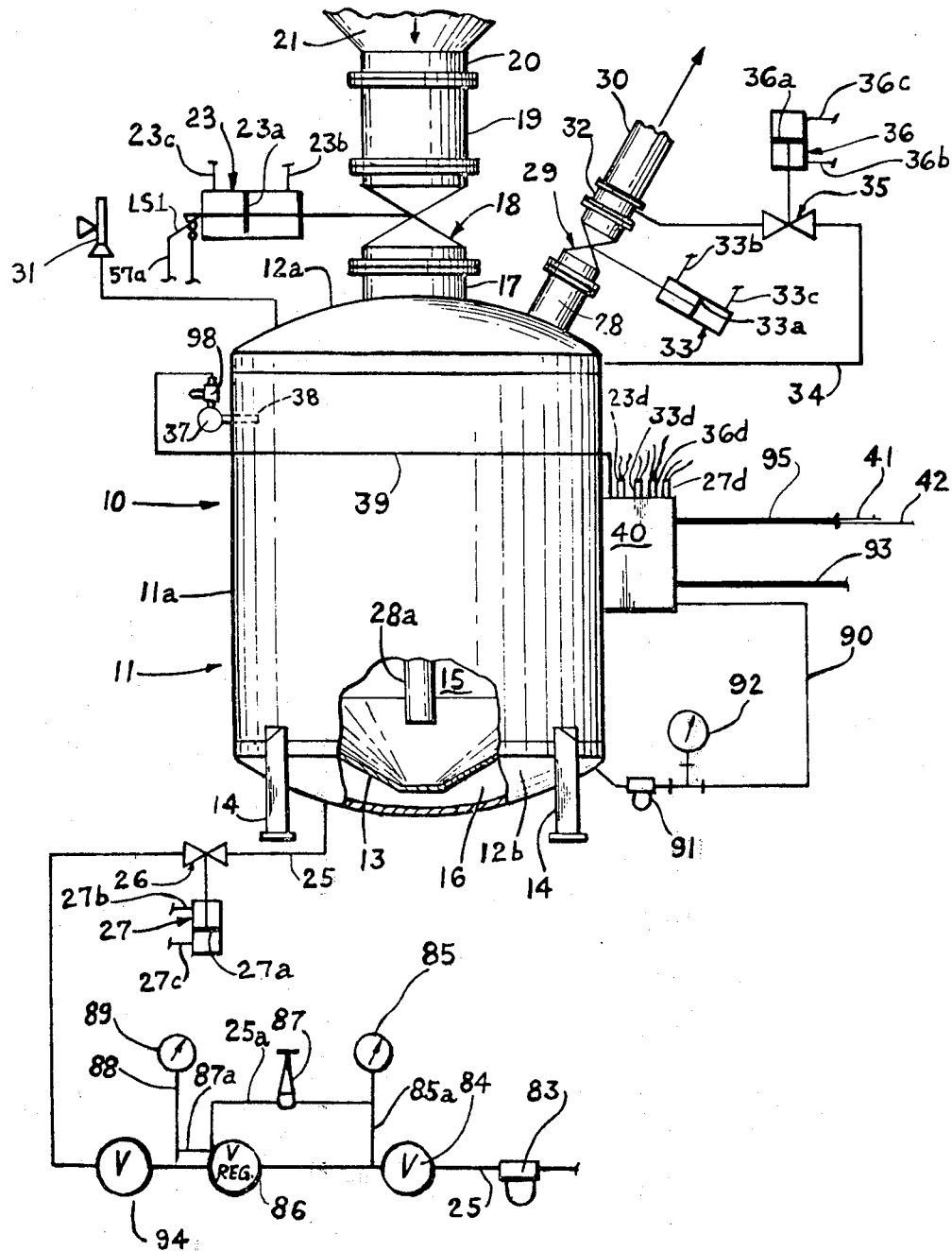
FIG. 1 is an elevational view, partially diagrammatic, showing the parent, fluid flow pump form of the invention.

Referring now to the drawings, FIGS. 1, 2 and 3 of the parent application, in which like reference numerals are applied to like elements in the various views, a material container, housing, pump or activator 10 is shown in FIG. 1 comprised of a shell 11 incuding a cylindrical main body 11a with upper end closed by a top comprised of a spherical segment or dome 12a and a bottom comprised of a spherical segment or lower closure 12b, the container being constructed after the general manner of conventional pressure vessels and designed with safety factors, to withstand the highest pressures that may be developed therein.

The pressure vessel or container 10 is supported on legs 14 which upstand from a conventional base or grout, not shown. A gas permeable membrane or diaphragm 13 separates the container into an upper, or material plenum 15, and a lower, or gas plenum 16.

The dome 12a has an inlet flange or neck 17 connected centrally into the top thereof with an inlet gate valve or fill valve 18 being mounted thereon. A flexible nipple 19 is shown connecting the fill valve 18 with a discharge flange 20 from a hopper 21, the nipple 19 being shown as a flexible member for carrying out an optional function, to be hereinbelow described.

A valve operator 23 is shown diagrammatically, as disposed to open and close the gate valve 18, a piston 23a being shown provided in the valve operator 23, with instrument air admissible under the piston 23a through a conduit 23b to open the fill valve, and with instrument air being admissible through a conduit 23c above the piston 23a to close the fill valve. Obviously, the conduits 23b and 23c must be in a closed compressed air circuit with a pressurized reservoir, or otherwise selectively supplied with compressed air, to carry out their respective functions.

A compressed gas conduit 25 is shown connected into the lower end closure 12b of the shell or pressure vessel 11 and such compressed gas inlet line 25 has a gas inlet valve 26 therein, which is shown connected to be opened and closed by a valve operator 27, constructed and equipped in correspondence with the valve operator 23.

Also, a discharge outlet pipe 28 extends downwardly through the dome 12a to terminate in a pick-up end 28a disposed slightly above the gas permeable or air permeable membrane 13. A valve 29 is shown connecting this discharge outlet pipe 28 with a discharge conduit 30, disclosed as having a flexible nipple 31 therein downstream from a purge line connection nipple 32, the flexible nipple 31 being for an alternative purpose to be hereinbelow described.

The discharge valve 29 is shown operated by a valve operator 33, which is indicated as being constructed, and as having connections thereto, in correspondence with the fill valve operator 23.

A purge line 34 extends between the purge line connection nipple 32 and the material plenum or chamber 15 and has a purge valve 35 therein to control its opening and closing, a valve operator 36 being shown connected to the purge valve 35 for this purpose, such valve operator 36 being constructed, and having connections in correspondence with the fill valve operator 23. However, it may be pointed out, in this regard, that the purge valve 35 should be a normally open valve, whereas the fill valve 18, gas inlet valve 26, and discharge valve 29 are normally closed valves.

Additionally, the support body 37 for a safeguarding vibratory paddle 38, operative on the tuning fork principle, is shown connected into the cylindrical body 11a of the shell 11, the material sensitive paddle 38 being indicated in dotted lines in FIG. 1 as extending within the housing 10 near the top thereof, such paddle being operative to actuate the valve operator 23 to close the fill valve 18, as will be hereinbelow described.

An insulative cord 39, having therein the electrical conduits to the paddle 38, extends from the paddle support body 37 to a control box 40, to be hereinbelow described, and shown mounted on the exterior of the activator shell body 11a.

As shown in FIG. 2, a positive line 41 and a negative line 42 extend from a source of electrical power, the positive line 41 having three parallel lines 41a, 41b and 41c branching therefrom with the line 41a service when manual control is to be used as will be hereinbelow described with the line 41b serving as a neutral third positive conductor and with the line 41c service as the positive conductor when automatic control is to be employed. A three-way switch, indicated generally by reference numeral 44, is provided to control the selection of automatic or manual control, as desired, and as shown, the switch 44 indicates that automatic control has been selected, the conductors 41b, 41c thus being closed and the conductor 41a being open.

A conductor 45 extends from the conductor 41c, and a pushbutton switch 45a is shown in FIG. 2 as closing circuit in this conductor, the conductor 41c continuing to a junction with three parallel circuits including the circuit of a variable time delay relay 46, the circuit 47 for a solenoid 48 which operates the fill valve operator 23 shown in FIG. 1, and the circuit of an indicator light 49 which may be designated as a green light for illustrative purposes.

The conductor 45 continues as the conductor 45a and has contacts 51a therein of a double acting pressure actuated switch 50, such contacts 51a being normally closed at atmospheric pressure and opening upon increase of pressure in the gas plenum 16. The conductor 45c continues from the contacts 51a to a junction with a conductor 45b having therein the normally closed relay contacts 56a of a latching relay 52, the conductor 45b terminating at its connection to the negative power line 42.

A parallel circuit 53 extends from the neutral or central positive conductor 41b, to the junction of the conductors 45a, 45c, such parallel circuit also including therein the contacts 51b of the aforesaid pressure actuated switch 50, such contacts 51b being normally open at atmospheric pressure and closing upon increase of pressure in the aforesaid gas plenum 16. The circuit 53 also has therein an indicating light 54, designated as a yellow light for indicating purposes, as will be hereinbelow described.

Another parallel circuit 55a, 55 from the positive conductor 41b has the switch 46a therein which is closed by the variable delay relay 46 at the end of its preselected cycle, the circuit 55 also having therein the coil 52a of the latching relay 52, and the circuit 55 being continued by the circuit 45a, as aforesaid. The circuit 55, as thus closed, energizes the latching relay coil 52a to open the normally closed relay contacts 56a to break the aforesaid parallel circuits 46, 47, 49 and 55, and upon the solenoid circuit 47 being de-energized, the solenoid 48 retracts and moves the valve operator 23 to close the fill valve 18, both valve operator and fill valve being shown in FIG. 1.

The latching relay 52 is of the well known type, which, when its coil 52a is energized, it actuates conventional switching means which opens the normally closed contacts 56a, and pulls closed the normally open contacts 56b in a parallel circuit 57 extending from the negative conductor 42, in manner that the latching relay mechanism latches against any movement except that which may be imparted to the switching means to pull open the normally open contacts 56b, which can only be effectuated by the energization of the latching relay coil 52b, to be hereinbelow described as to operation.

The normally open contacts 56b are disposed in a circuit 57 from the negative power line 42, and which branches into four parallel circuits: 58, including a fixed time delay relay of the thermal delay type; a circuit 59 which includes the coil for operating a solenoid 60 connected to actuate the valve operator 27, shown in FIG. 1, to open and close the compressed gas inlet valve 26; a circuit which includes the light 61 therein, which is designated as a blue light, for purposes of illustration; and a circuit 62 including the coil for operating a solenoid 63 connected to actuate the valve operator 36, shown in FIG. 1, to open and close the purge valve 35.

A circuit 57a continues from the junction of the circuits 59, 61 and 62, and has a switch 64 therein which is closed by the fixed time delay relay 58 when its circuit has been closed for its fixed period of time, while a circuit 57b continues from the junction of the circuit 57a and the fixed time delay relay circuit 58, to the aforesaid neutral or positive conductor 41b.

Also, a circuit 57c continues from the junction of the circuits 59, 61 and 62 with the circuit 57, and branches into: a circuit 65 including the coil which operates a solenoid 66 which actuates the valve operator 33, shown in FIG. 1, to open and close the discharge valve 29; a circuit including a light 67 therein, which is designated as a red light, for purposes of illustration; and a circuit having a relay 68 therein; a circuit 57d continues from the positive side junction of the circuits 65, 67 and 68, and branches into a circuit 57e having a normally open pressure actuated switch 69 therein, to be hereinbelow described, the positive side connection being completed with the conductor 41c; and into a circuit 57f having a pair of contacts 70 therein operated by the relay 68, and terminating by connection with the neutral or positive conductor 41b. A pushbutton switch 71 is shown in FIG. 2 closing the circuit 41c adjacent its connection to the circuit 57e.

Additionally a circuit 72b, 72a connects the positive or neutral conductor 41c with the negative power line or conductor 42; the circuit 72b having in series therein a pair of contacts 74, (operated by the relay 68 substantially simultaneously with its operation of the contacts 70 in the circuit 57f), and a normally closed, pressure sensitive switch 73, as will be hereinbelow described; latching relay coil 52b which operates to break circuit closed by the hereinabove described relay contacts 56b.

The gas, as compressed air, which activates and transports the material which enters the container, shell, or pressure vessel 11, arrives from its source, as a compressor or pressurized reservoir, and passes, shown in FIG. 1, through a strainer 83 and a globe valve 84 on its way to being regulated as to the pressure at which it is to be supplied. Thus the gas is first measured by a high pressure gauge 85 in the top of a gauge pipe 85a which upstands from the main gas line 25 through which the strained gas passes on downstream. A smaller sized by-pass line 25a extends between the gauge pipe 85a and the aforesaid pressure regulating valve 86 in the main conduit 25, and has a pilot regulating valve or regulator 87 therein, thus to permit a finer and more responsive control of the pressurized gas on its way to the pressure vessel 11. A by-pass line 87a conveys the reduced pressure gas from the pilot regulator 87, and connects with an upstanding gauge pipe 88 above the main conduit 25, a low pressure gauge 89 being mounted on top of the gauge pipe 88 to indicate the lowered pressure of the gas.

A conduit 90 extends from the lower closure 12b to conduct pressurized gas from the gas plenum 16 to the control box 40, there to bear upon and cause actuation of the pressure sensitive switch 50, operative as hereinabove described, and to bear upon and cause actuation of pressure sensitive switches 69 and 73, to be further described as to operation hereinbelow.

Such switch actuating gas, from within the pressure vessel 11, enters the conduit 90 and passes through a strainer 91 therein, and on the panel box 40, a gauge 92 being provided to indicate the pressure of the actuating gas as it passes downstream of the strainer 91 on its way to the panel box pressure sensitive switches, as aforesaid. The instrument air required by the pressure sensitive switches, as contradistinguished from the actuating air or gas, and any other air or gas required to actuate any of the apparatus, as that shown in FIG. 2, or as that required to operate the valve operators shown in FIG. 1, may be brought to the panel box 40 through a conduit 93 for selective distribution. Also, the power conductors 41, 42, from a source of electrical power, as a 60 cycle, 115 A.C. voltage source, may be brought to the panel box 40 through an insulated conductor cord 95.

A conventional fuse 96 is provided in the positive power line 41, indicated as comprising the conventional fuse strip 96a, and in a parallel circuit therewith, the conventional resistance 96b and indicating light 96c.

Also, a "fail-safe" or safeguarding, material sensitive, frequency change actuated, control assembly 37 is provided to insure the closing of the fill valve 18 in case the variable time delay relay 46 may not function to close the time-out switch 46a at the end of the time cycle period selected, as indicated diagrammatically in FIG. 2, and as shown partially diagrammatically and in greater detail in FIG. 3.

The fail-safe circuit 75 is shown extending from a point on the conductor 55 between the time-out switch 46a and the latching relay coil 52a, and is continued to a solids state relay housing 98, there to be connected to the junction between a conduit 75a to the normally open side of a relay switch 97, and a circuit 76 which extends to the positive conductor power line 41a, the circuit 76 having the push-button switch 77 therein, to be hereinbelow described. Normally, the relay switch 97 closes contact between a grounded conductor 97a (and thus the negative power line side 42), and a conductor means 99 between the relay switch 97 and the negative terminal of a coil 82 in the control housing 37.

The coil 82, within the housing 37, energizes a plunger or armature, not shown, in manner that it normally vibrates 120 cycles per second to impart vibration at this frequency to the tuning fork tine 38a which is connected to the paddle or vibrator 38. Thus normally the tine 38b also vibrates with the paddle 38 at 120 cycles per second. The vibrations of the tine 38b are imparted to an armature, not shown, which normally actuates a second coil 81, at an imparted voltage, at 60 cycles per second frequency.

An induction coil, not shown, is imposed across the terminals of the coil 81 within the plug so disposed with relation to the switch 97 that this switch may be shifted when the differential between the line voltage and the imparted voltage achieves a certain value, as is the case when material entering the container or activator 10 extends at such an angle of repose to interfere with, reduce, or stop the vibrations of the paddle 38.

When the aforesaid induction coil across the terminals of the coil 81 thus shifts the switch 97 to close circuit from the neutral or positive side conductor 41b, by way of the conductor 78, the coil 82, and the conductor 99, through the switch 97, as thus shifted, and by way of conductors 75a, 75, 55 (including the latching relay coil 52a), and on through the conductor 45c, the closed switch contacts 51a, and the circuit 45b (including the latching relay closed contacts 56a), to the negative power line 42. The energization of the latching relay coil 52a in the circuit 55 results in the latching relay breaking the circuit 45b by shifting open the contacts 56a, whereby the solenoid winding 47 is de-energized to actuate the solenoid 48 to operate the valve operator 23 to close the fill valve 18.

Obviously the quicker the fail-safe switch 97 is operated after a failure of the variable time delay relay 46 to close the time-out switch 46a, the less the material from the hopper 21 can overfill the container 10, and the closer the delivered batches of material may be controlled to deliver a desired lesser volume per batch.

Also, it is obvious that the variable time delay relay 46 may be omitted entirely, together with its time-out switch 46a, and in this case the frequency control device 37 alone can be relied upon to actuate the valve operator 23 to close the fill valve 18.

On occasion it may be desirable to operate the filling and evacuation of the container 10 by manual control of the sequence of steps, rather than automatically, as hereinabove described. For such occasion, it may be considered that the variable time delay relay 46 and its timing out switch 46a are immobilized. Then a circuit 101 is provided, parallel with the circuit 45, to extend from the positive conductor 41a and to connect with the circuit 45 between the pushbutton 45a and the circuit junction 46, 47, 49. Also, in this case there also serves the aforesaid circuit 76 from the circuit 41a to the junction of circuits 75, 75a, and having the pushbutton 77 therein; also the circuit 102, parallel with the circuit 57e and connected thereinto between the pushbutton 71 and the normally open pressure sensitive switch 69; also the positive power circuit 41a is extended to connect with the junction of the circuits 72a, 72b, and to have the pushbutton 103 therein.

Thus, with the three-way switch controlling the parallel conductor lines 41a, 41b and 41c turned from the position shown in FIG. 2, in manner that the conductors 41a, 41b are closed, the conductor 41c thus being left open. Beginning with the container 10 empty and at atmospheric pressure, the pushbutton 45a may be pushed downwardly and held to close the circuit 101. The circuit 47 is thus energized so that the solenoid 48 actuates the valve operator 23 to open the fill valve 18. Then, the pushbutton 45a may be released from closing the circuit 101, thus breaking circuit through the solenoid coil 47 so that the solenoid 48 actuates the valve operator 23 to close the fill valve 18.

With a batch of material delivered into the container 10 in amount determined by the length of time the pushbutton 45a has closed the circuit 101, activation of the material may be started, after the pushbutton 45a has been released, by manipulating the pushbutton 77 to close the circuit 76. Circuit is thus closed through the circuit 75, the circuit 55 including the latching relay coil 52a, and to the negative power line side 42, by way of circuit 45c, closed contacts 51a of the pressure sensitive switch 50, and the circuit 45b, including the latching relay closed contacts 56a therein. This energizes the latching relay coil 52a to operate the latching relay 52 to break the contacts 56a and close the contacts 56b.

Circuit is thus closed to the fixed time delay relay 58, which actuates the "Time out" switch 64 to close the solenoid coil circuit 59, thus to actuate the valve operator 27 to open the compressed air valve 26; also the solenoid coil circuit 62 is closed whereby the solenoid 66 actuates the valve operator 36 to close the purge valve 36.

Then, the operator of the apparatus may observe the gauge 92, and when the pressure indicates that the vessel is ready to discharge, or when the operator appreciates that a proper time interval after the opening of the gas inlet or compressed air valve 26 has taken place, the pushbutton 71 may be pushed to close the circuit 102, the normally open, pressure sensitive switch 69 being closed by the pressure that has built up in the vessel.

Thus, as aforesaid, the armature 65 may move to set in operation the opening of the discharge valve 29, while circuit is closed to operate the second relay 68 so that it closes the circuit 57f, and closes the contacts 74 to partially close the circuit 72b. Discharge may thus continue as long as the pushbutton 71 is held closing circuit 102, or even if the operator may now release the pushbutton 71, since in this case the circuit continues completed through the contacts 70 in the circuit 57f, even after the pressure has fallen enough to cause the pressure sensitive switch 69 to open.

Thus to purge the vessel 10 after the pushbutton 71 has been released, or thereafter, or at any time, with the three-way switch 44 turned to manual operation (41a, 41b closed), it is only necessary to push the pushbutton 103 to close circuit with the circuit 72a to energize the latching relay coil 52b, which, when energized, operates, as aforesaid, to close the circuit 45b and to break the circuit 57, whereby the purge valve 35 is opened and the compressed air valve 26 and discharge valve 29 are closed. Then, as the purge pressure diminishes the normally closed, pressure sensitive switch 73 opens, and as the pressure falls further to substantially atmospheric pressure, the contacts 51a of the pressure sensitive switch 50 close, and the pushbutton 45a may again be pushed to close the circuit 101 to admit material into the container 10.

Respective conduits 23b, 33b and 36b connect into the respective fill, compressed gas, materials delivery and purge valve operator cylinders, 23, 27, 33 and 36, under the respective piston heads 23a, 27a, 33a and 36a, and respective conduits 23c, 27c, 33c and 36c connect into such cylinders above the respective piston heads therein. Thus, as shown in FIG. 1, conductor cords or sleeves 23d, 27d, 33d and 36d for the respective conduits for the respective valve operator cylinders aforesaid, are provided to extend from the control or panel box 40, where conventional instrument air, as from the instrument air conduit 93, may pass through respective conventional solenoid actuated valves, not shown, as operated by the aforesaid solenoids 48, 60, 66 and 63, to admit the operative air, gas or fluid, selectively into the conduits 23b or 23c; into the conduits 27b or 27c; into the conduits 33b or 33c; and into the conduits 36b or 36c; selectively to open or close the aforesaid fill valve 18, compressed gas valve 26, materials delivery valve 29 and purge valve 35.

As shown in FIG. 2, a light 49 is in circuit parallel with the solenoid circuit 47 and the variable time delay relay circuit 46, and thus the light 49 is on when the fill valve 18 is open; also a light 61 is in a circuit parallel with the solenoid circuit 59 which actuates the valve 26 which admits the material activating compresses gas, and with the solenoid circuit 62 which closes the purge valve; and also a light 67 is in a circuit parallel with the solenoid circuit 65 which actuates the opening of the materials delivery valve 29. Additionally, a light 54 is shown in a circuit 53 which is complete when the latching relay 52 is actuated to close the contacts 56a while the pressure within the container is still high enough to maintain closed the contacts 51b of the pressure sensitive switch 50. Thus, this occurs after the purge valve 35 has been re-opened by opening of the latching relay contacts 56b, to permit the purging of the container by the residual pressure therein until such pressure drops to substantially atmospheric so that the pressure sensitive switch 50 is actuated to open the contacts 51b and close the contacts 51a, thereby breaking the circuit 53 which contains the light 54 therein.

The lights 49, 61, 67 and 54 may have selectively differently colored bulbs, as, respectively, green, blue, red and amber, thus to indicate, respectively, that filling, activating, discharging and purging are taking place.

The respective valve operators 23, 27, 33 and 36 may be used to operate the respective fill valve 18, compressed gas delivery valve 26, material delivery valve 29 and purge valve 35, as shown, but it is often not necessary, in the case of light duty installations, and/or in the case of the valves 26, 29 and 35, that special valve operators be required for their operation. In such cases the solenoids 60, 66 and 63 may thus be connected directly to the respective valves 26, 29 and 35 to effectuate their operation.

As to the gas permeable membrane 13, shown in FIG. 1, this may be variously constituted to carry out various requirements. The membrane 13 may be a flexible diaphragm as of a heavily woven cloth, as of cotton, or of a synthetic or plastic cloth as of nylon or Dacron. Also instead of being flexible the membrane may be rigid or substantially rigid. Thus it may be of woven metal, or of non-corrosive woven metal, such as stainless steel, to combat corrosion. Also it may be of a porous ceramic, also to avoid corrosion, as well as to provide a stable membrane. An additional advantage in their being selectivity in the synthesis of the membrane resides in the fact that a wider range of materials can be handled to pass through the membrane under the most advantageous conditions where this selectivity is available.

Also, as to the fail-safe feature of the vibrating paddle 38, the sensitivity of this feature is such that it can be regulated to operate almost instantaneously as a container first starts to overfill, so that the relay 52a is energized to operate the latching relay 52 immediately the variable time delay relay 46 fails to function.

Additionally, as set forth hereinabove, the vibratory paddle 38 may be used instead of the variable time delay relay 46, as the primary functional element to actuate the closure of the fill valve 18. In such case the sensitivity of the paddle 3 to adjustment, can determine the promptness of sensitivity to material to close the relay switch 97.

Figure 5:
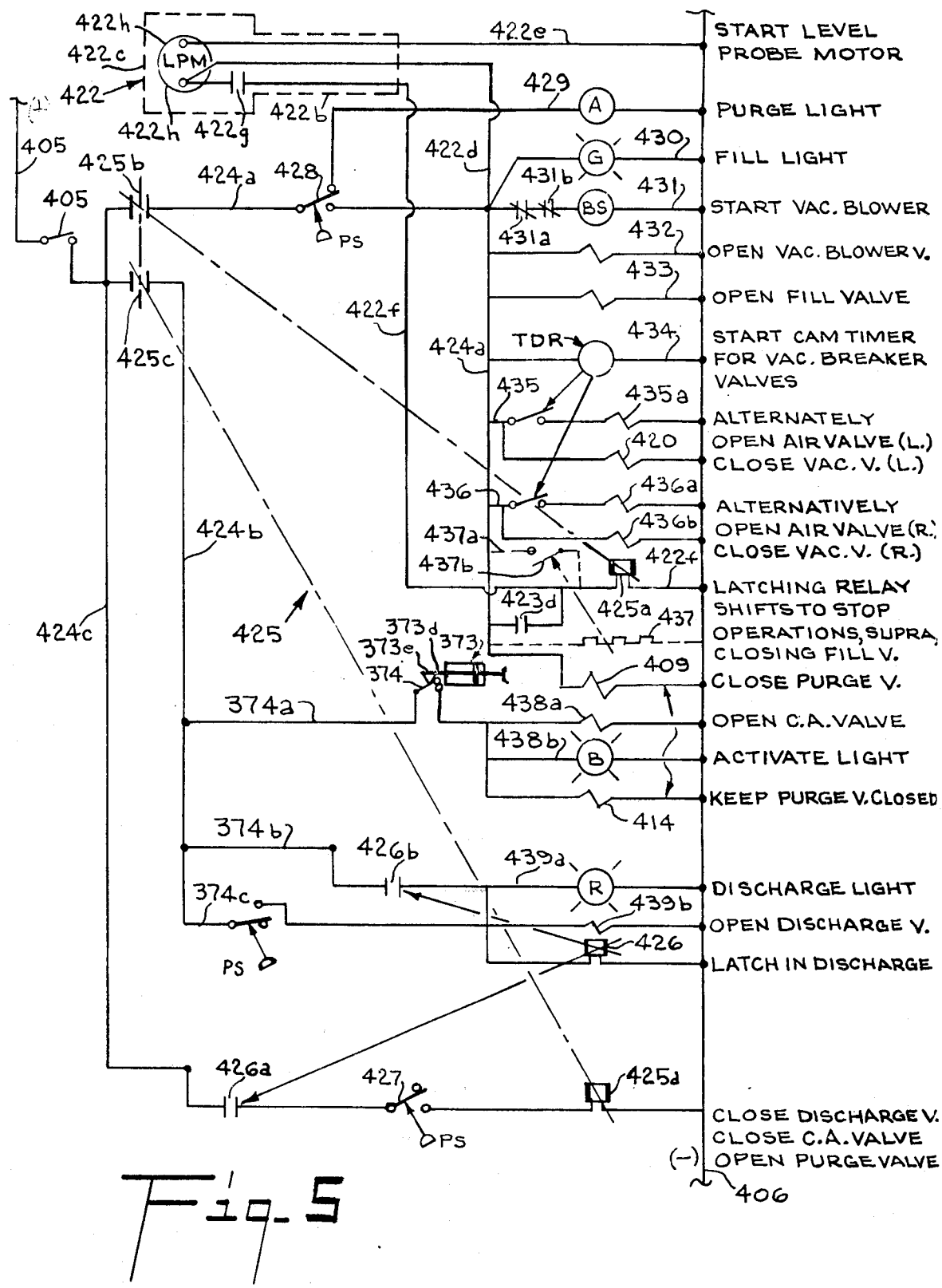
FIG. 5 is an electric diagram of circuitry for operating the vacuum filled, fluid flow pump shown in FIG. 4.

A fluid flow pump 360 is disclosed in FIGS. 4 and 5, equipped with apparatus that enables it to be filled by vacuum. As shown the pump or pressure vessel 360 is not mounted upon a load cell, as in forms of invention to be hereinbelow considered. Rather, in the disclosure shown in FIGS. 4 and 5, the simplest or basic form of the invention is shown, wherein a fluid flow pump or pressure vessel is adapted to be filled by the pull of vacuum applied beneath the perforate diaphragm or membrane that divides the pressure vessel into a material plenum above the diaphragm and a gas plenum therebelow.

The fluid flow pump 360 comprises a pressure vessel that may be variously termed a material container, housing, or activator defined by a shell 361 that includes a cylindrical main body 361a with upper end closed by a domed top or modified spherical segment 362a and lower end closed by a corresponding concave bottom or modified spherical segment 362b. The housing is thus constructed after the manner of conventional pressure vessels, and designed with safety factors to withstand the highest material activating pressures or the highest pulls of vacuum that may be imposed therewithin.

In the form of invention shown the pressure vessel 360 would be supported by conventional legs, not shown, to upstand above the floor, or above a firm base or grout. The gas permeable membrane or diaphragm 363, substantially V-shaped in cross-section in FIG. 4, divides the interior of the vessel into a material plenum 365 thereabove, and a gas and vacuum plenum 366 therebelow.

The gas and vacuum plenum 366 is shown divided into a left and right chamer 366a and 366b, respectively, by a vertical, diametrically extending divider plate 364, and optionally, the plenum 366 may be subdivided into further chambers by radially extending divider plates, as may be obviously appreciated. A vacuum pull valve 367a, 367b, is shown connected to pull from the uppermost parts of the respective left and right chambers 366a, 366b, and also vacuum break of air inlet valves 368a, 368b, are shown installed to break vacuum by admitting air upwardly into the lower, inner portions of the respective chambers 366a, 366b.

A nipple 369 is shown extending from the vessel top 362a, with a material inlet or fill valve 370 mounted on the outer end thereof, and with a flexible hose or pick-up conduit 371 extending outwardly from the fill valve 370 selectively to source of material supply. For instance such a hose or pick-up conduit 371 may be connected into the under side of a railroad car, or into any other kind of bin, container or hopper not disposed in immediate adjacency with the fluid flow pump 360.

A valve operator 373 is shown diagrammatically, as disposed to open and close the fill valve 370, a gate valve in construction, with a piston 373a being shown in the valve operator 373, and with instrument air being admissible through a conduit 373b to open the fill valve, and with instrument air being admissible through a conduit 373c outwardly of the piston 373a to close the fill valve. The piston rod 373d which carries the piston 373a and actually opens and closes the gate of the fill valve 370, is shown extending outwardly of the cylinder of the valve operator 373, with an insulated cam 373e being provided on the outer end of the piston rod 373d to close a normally open limit switch 374a in a circuit 374, to be hereinbelow described. Obviously the conduits 373b, 373c, must be in a closed compressed air circuit with a pressurized reservoir, or otherwise selectively supplied with compressed air, to carry out their respective functions.

The respective vacuum pull valves 367a, 367b, and the respective air inlet or vacuum break valves 368a, 368b, are shown in FIG. 4 equipped to be opened and closed by respective valve operators 375, 376, 377, 378, having respective pistons 375a, 376a, 377a, and 378a, therein, with closed compressed air circuit conduits 375b, 376b, 377b, and 378b, letting compressed air behind the respective pistons to open the respective valves to which the respective pistons are shown connected, and with closed compressed air circuits 375c, 376c, 377c, and 378c, letting compressed air into the outer ends of the respective valve operator cylinders to close their respective valves. A left vacuum pull conduit 379a extends from the valve 367a to the left end of a tee 379e and a right vacuum pull conduit 379b extends from the valve 367b to the right end of the tee 379c, with a vacuum blower valve 380 being connected to the central leg of the tee 379c, thereby to control the outlet from a blower 381, thus to place the respective conduits 379a, 379b, under vacuum. The vacuum blower valve 380 is indicated as being opened and closed by a valve operator 382 having a piston 382a therein, with closed compressed air circuit conduit 382b letting compressed air behind the piston 382a to open the valve 380, and with closed compressed air circuit conduit 382c letting compressed air into the outer end of the valve operator cylinder to close the valve 380.

After the pressure vessel 360 has been filled to a predetermined level, (weight, or for a predetermined time), by drawing in material through the fill valve 370 by the suction of vacuum pulling downwardly through the perforate diaphragm 363, the vacuum and air valves hereinabove described may be closed, as will be described hereinbelow, and then compressed air may be admitted into the gas plenum sections 366a, 366b, to pass upwardly through the perforate diaphragm or membrane sections 363a, 363b, to activate the pulverulent material to a highly flowable, pressurized state.

The compressed air, which activates and transports the material which enters the container or pressure vessel material plenum 365, arrives from its source, as a compressor or pressurized reservoir, and passes through a strainer 383 and a globe valve 384 on its way to being regulated as to the pressure at which it is to be supplied. Thus, the gas is first measured by a high pressure gauge 385 in the top of a gauge pipe 365a which upstands from the main gas or compressed air line 390, through which the strained gas passes on downstream. A smaller sized by-pass line 390a extends between the gauge pipe 385a and a pressure regulating vavle 386 through which passes the strained gas in the main compressed air line 390. A pilot regulating valve or regulator 387 in the by-pass line 390a permits finer and more responsive control of the pressurized gas on its way to the pressure vessel 360. A by-pass line 387 conveys the reduced pressure gas from the pilot regulator 387 to a gauge pipe 388 that upstands from the main gas or compressed line 390 downstream from the pressure regulating valve 386. A low pressure gauge 389 mounted on top of the gauge pipe 388 indicates the lowered pressure of the gas.

Downstream from the aforesaid gauge pipe 388 there is successively provided in the main gas conduit 390, first a globe valve 391, then a valve operator controlled valve 392, then a protective globe valve 393, after which the compressed air or gas conduit 390 extends to the central leg of a tee 390b from the opposed ends of which branch lines 390c and 390d connect into the respective left and right gas plenum chambers 366a, 366b. The gas inlet control valve 392 is operated by a piston 394a disposed within the cylinder of the valve operator 394, with closed compressed air circuit conduit 394b letting compressed air behind the piston 394a to open the valve 392, and with compressed air circuit conduit 394c letting compressed air into the outer end of the valve operator cylinder to close the valve 380.

A discharge outlet pipe 395 is shown extending angularly downwardly through the dome 362a, to which it may be affixed, as by welding, and the lower part of the discharge pipe 395 is shown extending vertically and terminating slightly above the inverted apex of the perforate membrane or diaphragm sections 363a, 363b. Above, and to the right of the vertical axis of the pressure vessel 360, the discharge pipe 395 terminates upwardly in a discharge valve 396, with a connection nipple 397 being shown installed at the outer or material exit end of the valve 396. From the upper end of the connection nipple 397 the discharge conduit 398 extends to a point of delivery, not shown, to which the successive batches of material delivered into the pressure vessel material plenum 365, are successively delivered.

A valve operator 400 is shown for operating the discharge valve 396, with a piston 399a having compressed air admitted therebehind through a compressed air conduit 399b to open the discharge valve 396, and with compressed air being admitted through a conduit 399c into the outer end of the valve operator cylinder to close the discharge valve.

A purge line 401 extends from communication with the interior of the material plenum near the top thereof to the connection nipple 397, thus downstream of the discharge valve 396. A purge valve 402 is provided in the purge line 401, and the purge line is operated by a valve operator 403, with compressed air being admitted behind a piston 403a therein, by way of a conduit 403b, to open the purge valve, and with a conduit 403c admitting compressed air into the outer end of the valve operator cylinder to close the purge valve 402. As the purge valve 402 requires a special arrangement of apparatus to carry out its millions in the fluid flow pump entailing filling the pump by the pull of vacuum, such arrangement will be hereinbelow described with relation to the control instrument panel 407, to be described hereinbelow in detail.

As hereinabove described with relation to the operation of the various forms of invention hereinabove described, and for applicability to the forms of invention to be described hereinbelow, positive and negative power line conductors 405, 406, within an insulated cord 404, have connected thereacross, within the panel box 407, FIG. 4, the respective solenoid windings or circuits that operate the valve stems of conventional four-way valves within the panel 407. Thus alternately, as the solenoid circuits are energized and de-energized, as the case may be, respective four-way valve stems are turned from disposition to direct instrument air into top of respective valve operator cylinder to close a respective valve in cycle, the bottom of the cylinder exhausting, and to direct instrument air into bottom of respective valve operator cylinder to open the respective valve in cycle, the top of the cylinder exhausting. Such solenoid circuits are shown in the diagram of FIG. 5, including the two solenoid circuits for the aforesaid purge valve, and such two circuits, included in the panel box 407, FIG. 4, are further indicated diagrammatically in FIG. 4, in their relation to a spool valve within the panel box 407, to be hereinbelow described.

The instrument air that enters the panel box or panel 407 by means of a main compressed air conduit 408, has conduits in parallel extending therefrom to each respective four-way valve, with exhaust opposite, and with respective opposed compressed air conduits extending from the four-way valve along an axis at right angles to the instrument air-exhaust axis, out of the panel box 407 to the respective tops and bottoms of the respective valve operators. The immediately hereinabove described opposed conduits are not shown extending from the panel box 407, in order not to clutter FIG. 4, but such a pair of conduits extends from such panel box to each respective conduit shown in FIG. 4 as extending from the opposite ends of the cylinders of the eight respective valve operators 373, 375, 376, 377, 378, 382, 394, and 400.

The problem presented in the closing of the purge valve 402, to be hereinbelow described in detail, is that this valve is to remain closed after a first solenoid circuit 409 closes it has to be de-energized. Thus a spool valve 410 has to be provided, with one end 411 of the valve stem 412 comprising the armature for the solenoid circuit 409, and with the opposite end 413 of the valve stem 412 comprising the armature for a second solenoid circuit 414.

A spring 415 attached to the left end of the valve stem 412, is shown diagrammatically as representative of a force that acts to pull the valve stem 412 to the left, against the rightward movement caused by either solenoid circuit 409 or 414 being energized. At the same step in circuitry when the solenoid circuit 409 is de-energized, the circuitry demands that the solenoid circuit 414 is energized, thus maintaining the spool valve stem 412 still held to the right, and thus the instrument air remains directed to the outer end of the valve operator 400 to keep the purge valve 402 closed.

Then, in the course of circuitry, when the left solenoid circuit 414 has to be de-energized to open the purge valve 402, by directing instrument air 408a into the inner end of the valve operator 400, this can be accomplished, as the right solenoid circuit 409 is still de-energized, so that the spring 415 may contract and draw the valve stem 412 to the left. The spool valve 410 and its porting with relation to its valve stem 412 is disclosed by diagrams in FIG. 4 and is of a well known, conventional construction.

For purposes of comparison one of the conventional four-way valves on a parallel instrument air line 408b is shown adjacent the diagrammatical showing of the spool valve 410 that operates the purge valve 402. the conduits 375b, 375c, from the valve operator 375 that operates the left vacuum pull valve 367a, are thus shown extending to opposite sides of the aforesaid four-way valve on an axis of 90° to the axis of the instrument air line 408b.

Opposite the instrument air inlet into the four-way valve, an exhaust port EXH. is shown, and diagrammatically, a handle that shifts porting in the four-way valve, is shown extending at 45 degrees to the left for connection to the left end of an armature for the energized solenoid winding 420 that extends across between the positive main power line conduit 405 and the negative or cold main power line conduit 406. Thus upon being energized the armature has been moved to the left, shifting the four-way valve handle to the left, thus placing the instrument air line 408b in communication with the conduit 375b into the inner end of the cylinder of the valve operator 375 to open the vacuum pull valve 367a, the upper end of the valve operator cylinder thus have been enabled to evacuate air via conduit 375c to the exhaust EXH. As to circuitry it should be noticed at this point that the right or upper spool valve shift solenoid winding 409 and the left or lower spool valve winding 414, are shown connected across the power circuits 405, 406.

A dotted line around the spool valve 410 and four-way valve shown by way of illustration and comparison, indicates that these items and their environment are within the panel 407 shown to smaller scale as affixed to the right side of the pressure vessel 360. As aforesaid, the remaining seven four-way valves within the panel 407 for shifting the direction of instrument air into the cylinders of the respective valve operators 373, 376, 377, 378, 383, 394 and 400 are not shown, and being conventional, these conduits and the related four-way valve and solenoid winding connections to power lines, are not shown in FIG. 4, in order not to clutter this view with obvious repetitive conventional details, however, it is stated categorically that these details, including their solenoid winding circuits, will be shown in the diagram of FIG. 5, to be hereinbelow described, as represented by the respective reference numerals applied to solenoid (windings), thus to avoid unnecessary showing of further and repetitive corresponding conventional details in FIG. 4.

A contentional relief valve 416 is shown in the top or dome 362a as a required safety feature, as in case of over-pressurizing the vessel during activation. Also a small line 417 is shown extending from communication with the gas plenum section 366b, and containing a strainer 418 therein, the line 417 extending into the panel box 497 for pressure switch actuation, as will be hereinbelow described. A gauge 419 is shown connected into a tee in the line, to render indicia of pressure.

The dotted line at an elevation above diaphram 363 represents material 421 that fills the pressure vessel material plenum 365, as drawn, in through the fill valve 370 by vacuum. When the material reaches the elevation of the revolved blade 422a of the rotated blade type level probe 422, the interposing of material against the revolving of the blade 422a, stops its further rotation and closes a switch in a circuit, there resulting the energization of the first coil of a latching relay, thus breaking the circuit of the level probe motor which has been revolving the blade during the fill cycle. A conductor cord 422b is shown extending from the motor and switch housing 422c, and this cord 422b extends to the panel 407. As indicated in FIG. 4, the cord 422b has conductors 422d, 422e and 422f therein, which within the panel connect, respectively, first to a conductor 424a, FIG. 5, from the positive power line 405; the second to the negative power line 406; and the third to the first latching relay coil 425b. FIG. 5, to be further described hereinbelow, with a further detailed description of the level probe 422 also to be set forth hereinbelow. As an alternative usage such level probe 422 may be employed, not in the operative circuitry as a first functional part thereof, but as a safeguard, or fail-safe, correspondingly as hereinabove described with relation to the level probe of FIG. 3, as in cases where the operation of the first latching relay coil to close the fill valve, is set, first to function at the end of a timer circuit.

As an alternatively operative feature, functioning in parallel with the level probe 422, a manometer switch unit 423 is shown in FIG. 4, installed at a proper functional elevation across a manometer tube 423a with lower inlet into the gas plenum 366 below the diaphragm 363 and with upper inlet into the material plenum above the highest probable level to which material may ever be expected to rise therein. A conduit 423b extends from the unit housing 423c to the panel box 407, and connects within the panel box to a switch operative responsive to the pressure differential between the material plenum above the material and the gas plenum below the diaphragm. This switch is in a circuit parallel with the level probe switch of the revolved blade type level probe immediately hereinabove described in general. The pressure differential at which the aforesaid manometer switch within the panel box is to close, is predetermined to be in comparable proximity with the material level disposition of the revolved blade 422a. Thus these are in parallel, and one safeguards the other, as will be hereinbelow further described in the description of the circuitry of FIG. 5.

Referring now to FIG. 5, a positive power line conductor 405 is shown with a master switch 405a therein to be turned on to start the panel box circuitry within the panel box 407, FIG. 4, to start a cycle of opera. From the conductor 405 three parallel extending circuits 424a, 424b, 424c, first include therein, respectively, the first latching switch 425b of a latching relay 425; the second latching switch 425c thereof; and a switch 426a, latched in by the relay 426, to be hereinbelow described, a normally open, pressure sensitive switch 427 closed at the start of the purge cycle, to be hereinbelow described, and disposed nearest to the negative power conductor 406, the second relay coil 425d of the aforesaid latching relay 425.

A normally open pressure sensitive switch 428, in the circuit 424a, closes contact with a purge light circuit 429 which includes the amber purge light A therein, and connects to the negative power conductor 406, the switch 428 shifting to close circuit in the circuit 424a when the pressure fluid within the pressure vessel, as reflected thereto through the small instrument air conduit 417, FIG. 4, drops to approximately 0.5 p.s.i. at the end of the purge cycle.

From the aforesaid level probe housing 422c, the conductor cord 422b is indicated in FIG. 5 as extending for connection into the panel box 407. The level probe housing 422c and the conductor cord 422b, shown in dotted lines, enclose all of the circuitry and apparatus disclosed in FIG. 5 that is not contained within the panel box 407. Within the level probe horning 422c, a circuit 422f extends from the positive side of the level probe motor 422h, and a switch 422g therein is closed when the revolutions of the motor 422h are stopped as the blade 422a is stalled as the material brought in through the fill valve reaches predetermined height in the pressure vessel. From the switch 422g the circuit 422g therein including the first relay coil 425a and terminating by connection into the main power negative conductor 406.

Also from the positive terminal of the level probe motor 422h, a circuit 422d extends within the conductor cord 422b, and inside the panel box 407 connects with the aforesaid circuit 424a from the positive side power line 405. And also, from the negative terminal of the level probe motor 422h, a circuit 422e extends within the conductor cord 422b, and inside the panel box 407 connects into the main power negative conductor 406.

The circuit 424a, from the positive side of the circuitry, discloses nine parallel circuits extending therefrom toward the negative power circuit 406. These circuits are successively, from top to bottom of the drawing sheet, a circuit 430 having a fill light, or green light G therein; a circuit 431 including the blower switch BS for starting the vacuum blower motor 381, FIG. 4, also two normally closed overload pressure switches 431a, 431b, set to open at two successively higher stages of overload; also a circuit including the armature windings of the solenoid 432 which turns the four-way valve that directs instrument air to the valve operator 382, FIG. 4, that opens the vacuum blower valve 380; also a circuit including the armature windings of the solenoid 433 which turns the four-way valve that directs instrument air to the valve operator 373 that opens the fill valve 370, FIG. 4; also a circuit 434 including a time delay relay TDR therein having a cam timer therein set operative when such circuit 434 is energized to control the spaced apart openings of the air valves 368a, 368b, FIG. 4, to be hereinbelow described; also a circuit 435 having parallel extending therefrom, control circuits 435a and the aforesaid circuit 420, for opening and closing of the respective left air valve 368a, and the left vacuum valve 367a, as aforesaid, with further description to be set forth hereinbelow; also a circuit 436 having parallel extending control circuits 436a and 436b, therefrom, for opening and closing the respective left air valve 368b and left vacuum valve 367b, with further description to be set forth hereinbelow; also a circuit including a normally open switch 423d, operable upon pressure differential between upper part of material plenum 365 and the gas plenum 366, as from the manometer 423, hereinabove described; and also a circuit including the hereinabove described windings of the solenoid 409, FIG. 4, for actuating closure of the purge valve 402 before the development of vacuum fill; this circuit connecting with the circuit 422f including the first relay coil 425a therein, and connecting into the main negative power circuit 406.

Alternatively employable timer circuitry 437 may be employed to control the fill cycle, with such a timer circuit 437 being shown extending in parallel with the hereinabove described parallel circuits, FIG. 5, between the positive side conductor 424a, and the negative side 406 of the main power line. The timer 437 is activated after the second relay coil 425d is operated to shift the latching relay 425 to close the relay switch 425b, and when the pressure sensitive switch 428 closes to start to fill cycle. The timer 437 is set to close a switch 437b in a circuit 437a that connects with or takes the place of the circuit 422f, shown in FIG. 5 as including the first relay coil 425a of the latching relay 425. Thus, when the time 437 times out, at the end of a predetermined time cycle, the switch 437b is closed so that the first relay coil 425a is energized to open the latching relay switch 425b, close the latching relay switch 425c, thus introducing activation of the material 421 that has been drawn in by vacuum through the fill valve into the material plenum during the vacuum fill cycle.

Whether the aforesaid latching relay shift discussed immediately hereinabove, may be effected by at least one of the closure of the manometer switch 423d and the closure of the level probe switch 422g, or by the closure of the time-out switch 437b, the closure of the circuit 424b is with the purpose of setting in motion the apparatus that is to accomplish the opening of the gas or compressed air admission valve 392, the protective globe valve 393 downstream from the compressed air inlet valve 392 being normally left open. With the compressed air valve 392 open, compressed air may pass into the gas plenum 365, thence to pass upwardly through the diaphragm 363 to activate the material drawn in by vacuum to upstand from the diaphragm 363 within the material plenum 365.

Three circuits 374a, 374b, and 374c, each extend from the positive side connected conductor 424b, (that includes the second latching relay switch 425c), with the first circuit 374a having therein, first, a limit switch 374, and thereafter, three parallel extending circuits 438a, 438b, and 438c, each connected to the negative side power line 406, the circuit 438a including the windings of a solenoid which operates a four-way valve to direct instrument air to the valve operator 394 to open the compressed air or gas inlet valve 392; second a circuit 438b including the activating light, or blue light B therein; and third, the circuit 414 that, as aforesaid, includes the windings of the solenoid which employs the left end 413 of the spool valve shaft 412 as armature, thus to keep the spool valve shaft 412 urged to the right to keep instrument air directed to the purge valve operator 403 in manner to keep the purge valve 392 closed.

The second circuit 374b has therein a relay operated switch 426b and in series therewith, and each connected to the negative side power line 406, three parallel extending circuits 439a, 439b, and 439c, with the circuit 439a including the discharge light or red light B therein; with the circuit 439b including the windings of a solenoid which operates a four-way valve to direct instrument air to the valve operator 400 to open the discharge valve 396; and with a circuit 439c that includes the coil of a control relay 426 therein that latches in the discharge cycle, when energized, by closing the aforesaid switches 426a and 426b.

The third circuit 374c contains therein a normally open pressure sensitive switch 430 that closes when the pressure in the highly pressurized pressure vessel attains a certain predetermined maximum high valve, the instrument air that operates this switch 430 being conveyed thereto through the small conduit 417, hereinabove described, 25 p.s.i. being designated as a maximum high pressure for actuating closure of the switch 430.

Considering FIGS. 4 and 5 together, the operation of the pressure vessel is apparent. With the master switch 405a closed, and the pressure within the pressure vessel 360 at substantially atmospheric, so that the pressure sensitive switch 428 closes circuit through the positive side conductor 424a. The respective parallel circuits 422d, 422e, 430, 431, 432, 433, 434, 435, 436, and 409 are energized, respectively to start the LPM motor 422h revolving the probe blade 422a; to turn on the green light G indicative that vacuum fill is in process; to start the vacuum blower 381; to open the fill valve 370; to start the time delay relay TDR turning the cam timer which opens the air valves 368a, 368b, approximately one out of every seven seconds; to open the left vacuum valve 367a, and to open and close the left air valve, 368a, responsive to time delay relay time cam action; to open the right vacuum valve 367b and to open and close the right air valve 368b responsive to time delay relay time cam action; and to close the purge valve 402.

As the material is drawn into the material plenum 365, it builds up on the perforate diaphragm 363 (363a, 363b) until it reaches the elevation of the revolving blade 422a, to stall this blade from turning, thus to close the level probe switch 422g, (or until the pressure differential between the upper material plenum 365 and gas plenum 366, (366a, 366b) closes the manometer switch 423d in the panel box 407). In either case, regardless of which event occurs first, circuit is closed through the first latching relay coil 425a, via 422f, 422g, 422d, (or via 422f, 423d) to the positive side conductor 424a, and the relay coil 425a operates to break or unlatch the latching relay switch 425b, thus breaking all of the aforesaid energized circuits.

The breaking or unlatching of the right or upper latching relay switch 425b results in the closing or latching of the left or lower latching relay switch 425c so that the closing of the fill valve 370 by the fill valve operator 373 closes the limit switch 374 in the circuit 374a, thus energizing the respective parallel circuits 438a, 438b, and 414. Thus the compressed air or gas valve 392 is opened, and blue activate light B is turned on, and the solenoid 414 is energized to keep the purge valve 402 closed.

As the activating gas or compressed air builds up pressure in the pressure vessel, that pressure is reached, say approximately 25 p.s.i., to close the pressure sensitive switch 430 in the circuit 374c, thus energizing the respective circuits 439a, 439b, and 426. Thus the red or discharge light R is turned on; the discharge valve 396 is opened; and the control relay 426 (for latching in discharge) is energized.

The control relay 426 then acts to close the switch 426b in the circuit 374b, and the switch 426a in the circuit 424c. Thus, when the pressure in the pressure vessel 360 first begins to fall under discharge, the pressure sensitive switch 430 re-opens to break the circuit 374c. However, since the circuit 374b has been closed by the control relay 426 having closed the switch 426b, the red light R remains on the discharge valve 396 remains open, and discharge continues until the pressure in the pressure vessel 360 drops to say 18 p.s.i. at which time the normally opened pressure switch 427 in the circuit 424c closes. Since the aforesaid control relay 426 has previously closed the switch 426a, the circuit 424c, including the second latching relay coil 425d, is energized.

Note that the aforesaid switch 427, being closed at lower pressures, and opened at higher pressures, was first closed, (but with the control relay operated switch 426a open), from the beginning of relay shift to close latching relay switch 425c until the pressure vessel pressure came under activation exceeding say 18 p.s.i., at which time it had opened. Thus it had remained open during the last part of activation, and during the opening of the discharge valve 396, and the operation of the control relay 426, and until the end of the discharge cycle. But since the control relay had previously closed the switch 426a, when the switch 427 re-closed as the pressure fell to say 18 p.s.i., set to start the purge cycle. As the second latching relay coil 425d may now be energized to shift right, the purge cycle may now start.

When the latching relay switch 425c is now unlatched, the circuits 374a, 374b and 374c are broken, and the de-energization of the solenoids 438a and 414, and of the solenoid 439b respectively, permits the closing of the compressed air or gas inlet valve 392 and the opening of the purge valve 402, and the closing of the discharge valve 396. Thus the purge cycle may start, with the residual material in the pressure vessel being blown out through the purge valve 402, and by-passed back into the discharge line 398, downstream of the closed discharge valve 396, until the pressure falls to say 0.5 p.s.i. to permit the aforesaid pressure sensitive switch 428 in the circuit 424a, to close, thus to start a succeeding fluid flow pump cycle, as hereinabove described.

The advantages of the vacuum filled fluid flow pump 360 are obvious. Especially, the pump may be installed on a portable mount and taken with ease to the location of various materials to be evacuated from containers, other than from fixed hoppers. For instance such a portable pump may be taken to the location of material in railroad cars, and with suitable compressors, vacuum blowers, and sources of electricity provided the flexible fill conduit 371 may be disposed under a railroad car suitably through the conventional trap door thereof. Also, the discharge conduit 398, also a flexible conduit, may be directed to deliver into suitable conveyances for the further transport of the materials.

Figure 6:
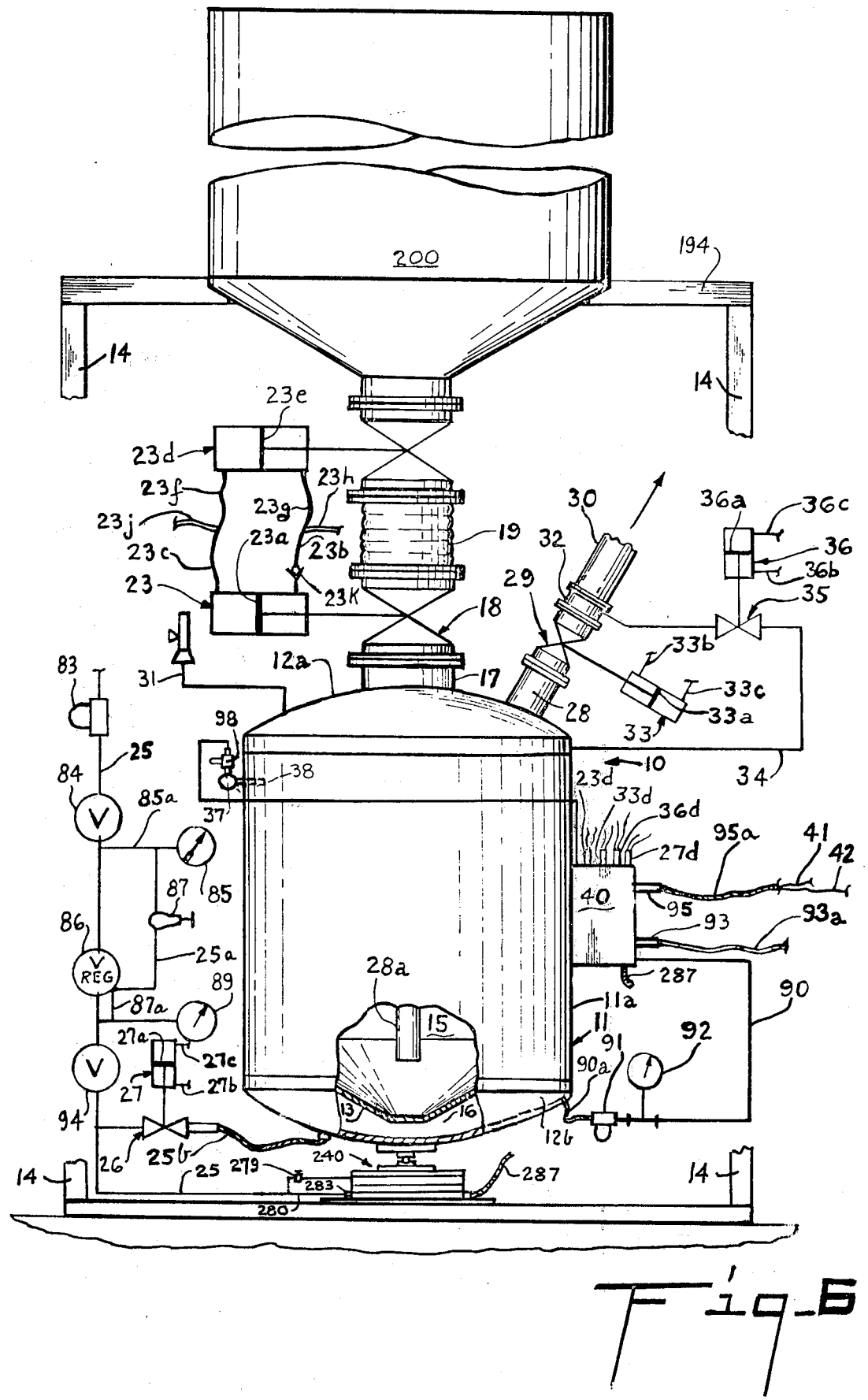
FIG. 6 is an elevational view, partially diagrammatic, showing substantially the invention of FIGS. 1 and 2, but adapted to weigh material being handled on a load cell and to reflect a weight responsive pressure signal therefrom to actuate closing of the fill valve.

A popular embodiment of the invention is shown in FIGS. 6–12, in which the pump 10, shown in FIG. 6, is mounted on a load cell 240 and adapted to transfer a batch of material when the batch weight entering the pump attains a predetermined weight. The load cell 240 is thus adapted to reflect weight in terms of pressure and thus the time delay relay 46 shown in FIG. 2 is replaced in the circuitry shown in FIG. 11 by the symbol PS indicating that the switch 46a is closed responsive to pressure.

The form of scale termed a load cell 240 shown in FIGS. 6–12, has a number of advantages which will be set forth hereinbelow. Functionally and primarily such a load scale registers a very small displacement under great weight, with the displacement being capable of accurately responding to minute displacements, and with the load cell being the subject of accurate calibration of the pressure fluid signals it imparts.

The load cell is, in essence, a pneumatic weight transmitter comprising a weight measuring instrument or scale 240, on which a fluid flow pump or pressure vessel 10, FIG. 6 or 250, FIG. 7, may be point mounted in manner to be hereinbelow described. A frame 241 is shown in FIG. 7 upon a base 242, which seats on the floor or shop level 243, as of a plant or business. The frame 241 of structural angles is comprised of upper runners 241a, uprights 241b, and lower runners 241c affixed to the base 242. Channels 244a, 244b extend across between two opposed runners, and support a base plate 245 on which the load cell 240 is mounted.

The fluid flow pump 250 shown in FIG. 7 above the load cell 240, has balanced connection to the frame 241, balance being obtained as will be set forth. Lugs, as the lug 244, FIG. 7, are connected to the respective uprights centrally thereof, and successively around the frame in swastika pattern. Also four channels 251, in diametrically opposed pairs, are connected to the pressure vessel shell to extend radially outwardly therefrom, with directions of the channels facing in the same way, or in swastika fashion. Then the threaded end of each eyebolt 245a is passed outwardly through its respective lug 244, and has a nut 246 threaded thereon. See FIGS. 8 and 9 with relation to FIG. 7.

A connection bolt 247 has its threaded end passed in outward direction through a bore 248a in the outer end of a connection plate or strap 248 and then through the eye of the eyebolt 245, then through a washer 249 to have the nut 246 threaded upon the outer end of the connection bolt 247. A similar bolt 247 has its threaded end passed inwardly through a bore 248b in the inner end of the strap 248, then through the eye of a slightly shorter eyebolt 245a, then through a washer 249 to have the nut 246 threaded upon the inner end of the bolt 247. The threaded end of the shorter eyebolt 248a is passed through a bore in the flange of the respective channel, and a nut 246 threaded upon the end of the eyebolt to complete the assembly. As may be seen, the pressure vessel 250 is thus assembled, with relation to the frame 241 in manner that adjustment to equalize any eccentricity of assembly, and inequalities of strains, as transmitted to the various frame elements.

The load cell 240, FIG. 10, includes as housing 252, a top or assembly hold-down ring 252a, a tare weight and damper chamber plate 252b, a vent chamber plate 252c and a control chamber plate 252d. An upper diaphragm or flexible member 253a has its peripheral area confined between the plate 252b and the assembly ring 252a. Inwardly of the ring 252a, and concentrically spaced therefrom, an anvil or assembly hold-down plate 254a seats over the central area of the upper diaphragm 253a, with the central area of the upper diaphragm being supported underneath, as will be hereinbelow described. An anvil or cover disc 255a is installed upon the plate 254a by machine screws 256 with a central boss 257a thereon having a recess 258a centrally therein to receive a lower segment of a sphere or ball 259. The plate 254a and disc 255a together comprise the anvil 254.

The lower surface of the pressure vessel or fluid flow pump 250, FIG. 7, is indicated as being substantially flattened in FIG. 8 over a limited distance, whereby to receive an upper or connection plate or disc 255b thereagainst for connection to the bottom of the pressure vessel 250 as by machine screws 256. Such disc 255b has a central boss 257b thereon, having a recess 258b centrally therein, downwardly facing, to receive an upper segment of the sphere or ball 259. With this construction, in view of the relatively small size of the ball 259 with relation to the pressure vessel, it may be said that the pressure vessel 250 has substantially balanced, point supported contact on the load cell 240; this being true especially in view of the adjustably balanceable manner by which the pressure vessel 240 may be connected to the frame 241, as aforesaid.

A central diaphragm of flexible member 253b has its peripheral area confined between the plate 252b and the vent chamber plate 252c. A flange 260 shown in FIG. 10 as having substantially the same outer diameter as the hold-down plate 254a bears upwardly against the upper diaphragm 253a. Such flange 260 provides centrally, a downwardly facing, centrally recessed boss 260a to receive loose fitted into the recess 261 an upper spring retainer cup 263a.

The hold-down plate 254a has a central recess 254b downwardly therein, and is centrally bored, as is the upper diaphragm 253a, and also the flange 260, to receive the assembly rod 265 therethrough. Within the recess 254b a large assembly nut 262 is threaded upon the upper end threaded portion 265a of an assembly rod or stud 265, with a lock nut 266a being threadable upon the threaded portion 265a to bear in locking relation upon the upper surface of the adjustably positionable aforesaid assembly nut 262.

The tare weight and damper chamber plate 252b has a large central bore therethrough and is counterbored thereabove, upwardly to the same diameter as the inner diameter of the hold-down ring 252a, thereby providing a measureable annular area of upper diaphragm 253a to be exposed to the tare weight adjustment fluid pressure to be hereinbelow described as provided in the damper and tare weight adjustment chamber 263.

The upper spring retainer cup 263a, slidable upon the stud or rod 265, is borne upwardly to seat in the boss recess 261 by the spring 264 which bears downwardly within a lower spring retainer cup 263b which is adjustably threadable upon the lower threaded portion 265b which of the assembly rod stud 265.

A bearing ring 267 below the lower spring retainer cup 263b receives the stud 265 therethrough, the stud 265 passing centrally through the central diaphragm 253b. Thus outwardly of the ring 267 and inwardly of the bore through the plate 252b there is provided a measurable annular area of central diaphragm 253b that is subject to the tare weight adjustment fluid pressure to be hereinbelow described. A retainer of lock nut 266b is threadable upon the stud lower threadable portion 265b to retain the bearing ring or washer 267 against the central diaphragm 253b. An adjustment air passage 268 (right) is shown passing radially through the plate 252b to communicate with the chamber 263 and a corresponding radial passage 268 (left) is shown plugged with a closure plugged fitting 269, but which may be employed to serve additionally or alternatively with the passage 268 (right). The admission of adjustment air or fluid into the chamber 263, and the control thereof, will be described hereinbelow.

The vent chamber plate 252c is bored centrally to the same diameter as the plate 252b thereabove, and has a lower counterbore therein, whereby the aforesaid bore and counterbore provide a vent chamber 270. A spool 271, having upper and lower flanges 271a, 271b, thereon of the same diameter as the outer diameter of the washer or bearing ring 267, is provided to occupy the vent chamber 270, with the lower portion of the stud 265 threadably extending downwardly therethrough. The lower flange 271b of the spool 271 bears centrally upon a lower flexible diaphragm 253c which has its peripheral area retained between the vent chamber plate 252c and the control chamber plate 252d therebelow.

An annular upper bearing ring 272a, of slightly lesser outer diameter than the vent chamber counterbore, of substantially greater inner diameter than the spool flange diameters, and of slightly lesser thickness than the depth of the vent chamber counterbore, is shown concentrically disposed in the vent chamber 270 to bear upon the lower diaphragm 253c, and is preferably affixed thereto, as by glue or industrial cement. Between the inner periphery of the bearing ring 272a and the spool flange periphery, a measurable annular area of the lower diaphragm 253c, is provided that is subject to vent chamber, usually atmospheric, pressure thereabove, and to control chamber fluid pressure therebelow, to be hereinbelow described.

Radial vent passages 273 are shown in the vent chamber plate 252c for communicating the vent chamber 270 with ambient or atmospheric air. The load cell housing or body is indicated as being assembled by flat head machine screws 274 passed downwardly successively through ring 252a, diaphragm 253a, plate 252b, diaphragm 253b, plate 252c, diaphragm 253c, and plate 252d, with at least the lower, threaded portion of the screw being theadably engageable down into the control chamber plate 252d, and preferably threadably engageable through all or most of the parts thereabove.

The lower or control chamber plate 252d has lowermost a centrally threaded bore to receive an externally threaded valve seat member 275 therein, and thereabove three successively larger counterbores are provided, together to comprise the control valve chamber 276. The uppermost counterbore in the plate 252d is of substantially the same diameter as the diameter of the vent chamber counterbore immediately above the lower diaphragm 253c.

An annular, lower bearing ring 272b, corresponding in dimension with the upper ring 272a, and thus of thickness less than the depth of the uppermost counterbore in the control chamber plate 252d, is disposed concentrically within the uppermost control chamber plate counterbore, as by affixing to the underside of the diaphragm 253c, as by industrial cement or glue. Inwardly of the ring 272b, and centrally under the diaphragm 253c there is disposed a guide cup 277 having upwardly a flanged head 277a of the same diameter as the spool flange on the upper surface of the diaphragm 253c, thereabove. The lower end of the stud 265, which passes centrally through the diaphragm 253, is threadably engaged centrally downwardly to terminate in the guide cup head 277a, thus to bring the upper surface of the flange head 277a to bear in assuredly assembled relationship against the under surface of the aforesaid diaphragm 253c.

It can thus be seen that any weight placed on the load cell 240, as by the pressure vessel 250 thereabove, in empty state is to batch material, but with all operative apparatus and accessories thereon, as they reflect in weight, constitutes tare weight. Obviously this tare weight will tend to cause the upper diaphragm 253a to flex or yield downwardly, and by virtue of the assembly of elements within the load cell body or housing to the assembly rod or stud 265, a corresponding movement tendency is transmitted through to the central diaphragm 253b and the lower diaphragm 253c. Tare weight adjustment thus may be described as pressurizing the chamber 263 to cause the upper diaphragm 253a to move up a degree under tare weight so that only material weight or batch weight produced motion registers in the control or net weight chamber 276.

To accomplish such pressurization of the chamber 263, an adapter nipple 278 is shown threaded into the outer end of the fluid passage 168 (right) to have a tare control device or fitting 279 mounted thereonto which receives compressed air into the side thereof opposite the nipple 278 through an inlet nipple 280a. The tare control 279 comprises a regulator which may be immediately or remotely operated or controlled to place the compressed air inlet in communication with the chamber 263 to permit the introduction of compressed air thereinto to offset the tare weight, as aforesaid, so that only the weight of the net or material batch load may be reflected by the net load or control chamber 276, as will be hereinbelow described.

A valve element 281 has a lower face that seats upon the upper or inner surface of the valve seat 275 normally to occlude a bleed hole or relief passage through an orifice fitting 286 that is indicated in FIG. 10 as having been press-fitted centrally through the valve element 275. The upper part of the valve element 281 comprises a cup or spring retainer in which seats a control spring 282, the upper end of the spring 282 bearing upwardly against the under surface of the flange head or flange 277a comprising the upper member of the aforesaid guide element 277 in the lower portion of which bears slidably the upper portion or spring retainer cup of the valve element 275.

As shown in FIG. 10 a source of pressure fluid supply, as compressed air, arrives through a conduit 280, and branches at a tee 280b, with part to pass via a nipple 280c, through a union 280d, a nipple 280e, and elbow 280f to the aforesaid inlet nipple 280a, into the tare control fitting 279. From the central or intersecting leg of the tee 280b, a nipple 280g connects into a flow regulator fitting 283 of simple and conventional design having the function of controlling or regulating the flow of pressure fluid that passes therefrom through an externally threader adapter member 283a via an inlet passage 284a, into the load cell control chamber 276.

Leading from the control chamber 276, on the opposite side thereof from the inlet passage 284a, there is shown in FIG. 10 an outlet passage 284b, with an adapter fitting 235 threaded into the outer end thereof, and with a rubber tubing 286 connected onto the outer end of the adapter fitting 285, to transmit the pressure fluid signal responsive to net load measured by the control chamber 276, as will be hereinbelow described. Noticeably in this regard, the orifice 285a through the adapter fitting 285 is substantially smaller in diameter than the passage 284b, and than the passage or conduit through the rubber tubing 287. Thus the adapter fitting 285 may be termed as choke adapter.

Any impact that otherwise might be imparted to the anvil 254, as by the rapid filling of the pressure vessel 250 with batch material, is adequately and forcefully opposed or dampened by the spring 264, thereby protecting the upper diaphragm from rupture anywhere along the annular area 287 where internal fluid pressure is opposed by the weight on the anvil 254 thereabove. Also, any downward movement imparted to the upper diaphragm area 287, (by way of the tare weight adjustment chamber 263, as pressurized to neutralize tare weight), on to the central diaphragm area 288, is not transmitted on to the lower diaphragm area 289, and to the control chamber therebelow, because the vent chamber 270 below this diaphragm area 288 is vented to atmosphere, as through the passageways 273.

Thus any downward movement caused by batch weight or net load build-up in the pressure vessel 250 is only transmitted from anvil 254 via the connecting rod or stud 265 to the diaphragm 253c, including its area 289. Responsive to this downward urging under batch weight or net load impulse, the flange head 277a compresses the control spring 282, and the guide member 277 moves downwardly upon the valve element 281, thereby decreasing the volume of free, effective space for fluid flow between control chamber inlet and outlet.

The pressure fluid that flows through the flow regulator 283 into the chamber 276 builds up pressure therein, since the fluid enters much faster than it can escape through the choke passage 285a, and normally with fill valve closed, is at say 3 p.s.i. Excess fluid, tending to raise pressure in the chamber 276, being bled off through the bleed passage 286. Upon fill valve opening, as the volume of the chamber 276 is decreased under batch load, the pressure in the chamber 276 reaches a pressure that balances the net load, batch weight, or weight not neutralized by tare weight adjustment. Then the pressure remains constant and any excess air will lift the valve seat 281 against the pressure of the spring 282, and let the excess air escape through the orifice fitting 286. Since the load cell 240 has its control chamber plate 252d adapted usually for installation flat upon a mounting plate 245, as shown in FIG. 7, the under surface of the plate 252d has radially extending grooves 288a, 288b, shown therein in FIG. 10, so that any air that escapes through the orifice fitting or nozzle orifice 286 into the central space below the valve seat member 286, may further escape through the grooves 288a, 288b, to the atmosphere.

Figure 11:
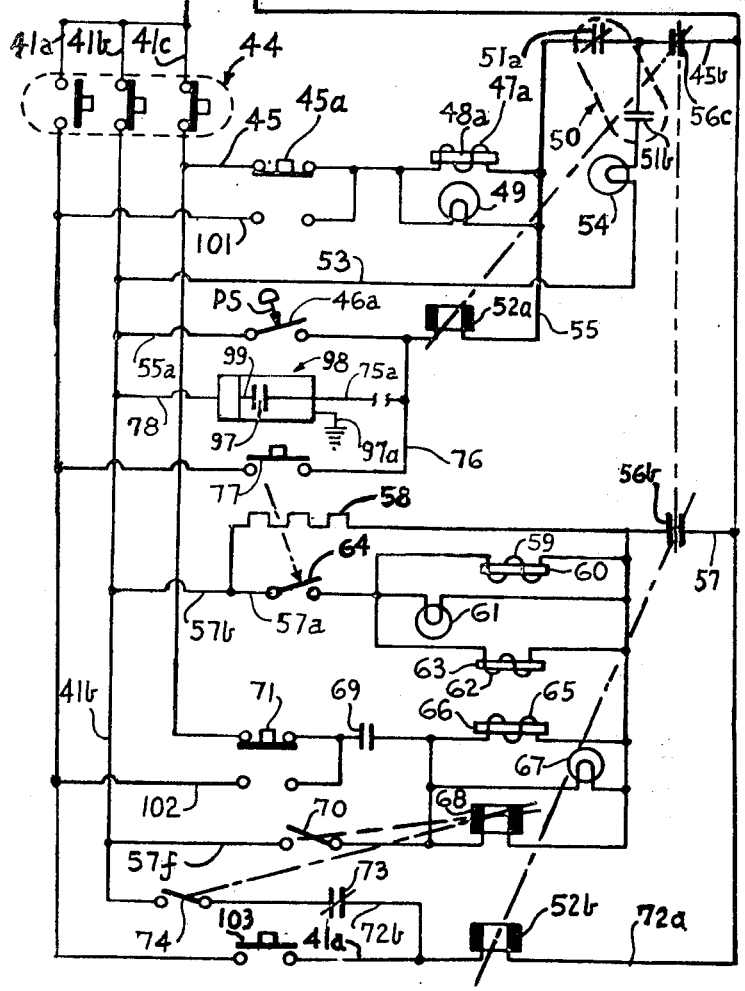
FIG. 11 is an electrical diagram of the apparatus and circuitry shown in FIGS. 6–10, inclusive.

The intensity of the fluid pressure signal that is transmitted through the conduit or flexible tubing 287, as to a pressure sensitive switch 46a, FIG. 11, bears linear relationship to net load or material weight, and such a switch 46a may be calibrated to close and set in motion fill valve closure when a predetermined batch weight has been deposited in the pressure vessel. Thus load cells of the type hereinabove described may be used, not only with the circuitry for the pressure vessels hereinabove described, but with circuitry for types of pressure vessels to be hereinbelow described, and in other usages. In all cases it may be used where it may be desired to effectuate fill valve closure responsive to the build up of a predetermined net load or batch weight on the diaphragm of the pressure vessel.

The circuitry of FIG. 2 and of FIG. 11 agree in every detail except that it may be noticed that in FIG. 11 the switch 46a is closed by the fluid pressure actuation of PS. This closure is by the load cell 240, FIGS. 6 and 10, which exerts a fluid pressure through the conduit 287 that passes to the instrument panel 40, FIG. 6, in correspondence with the pre-determined net weight of material that flows through the fill valve to actuate the load cell. On the other hand, in FIG. 2, the switch 46a is shown closed by operation of the timer 46. In either case the circuit closure effected results in the latching relay shifting position to close the fill valve. In the circuitry of both FIG. 2 and of FIG. 11 the level probe 37 is indicated as a fail safe or safety feature, as by broken line circuits 78, 75a.

Figure 12:
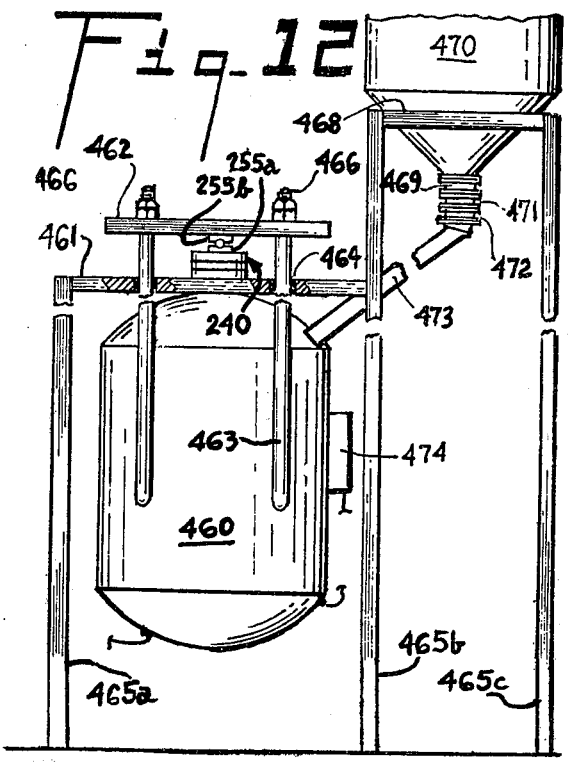
FIG. 12 is an elevational view, partially diagrammatic, of a fluid flow pump as shown in FIGS. 1 and 6, as suspended from a load cell that is rigidly supported above floor level to receive material from a hopper, all rigidly supported from floor level.

Referring now to FIG. 12, a fluid flow pump type pressure vessel 460 is shown, with the salient feature about this installation being that a fixed platform 461 supports a load cell 240, a platform 462 has an anvil upper part 255b mounted centrally thereunder to seat on a lower anvil part 255b comprising the uppermost member of the load cell 240 that is included in the load cell parts supported by the lower or fixed platform 461.

From the under side of the upper platform four stanchions or support pipes 463, symmetrically disposed from the vertical axis through the pressure vessel 460, are indicated as passing guidably through holes 464 through the lower platform 461 with the pipes or strong connection rods or stanchions 463 being thus spaced from the aforesaid vertical axis that they extend in line of contact against the pressure vessel 460 and may be affixed thereto, as by welding. In this manner, the mounting of the pressure vessel 460 is in the balance with, and in co-axial vertical alignment with the vertical axis of the load cell 240 on which the weight of the pressure vessel 460 and of its associated and attached structures, bears in suspension. In FIG. 22 the left uprights 465a, that upstand, as from the factory floor, are shown connected to the left end of the lower or fixed platform 461. Also, central uprights 465b are shown as having the right end of the lower or fixed platform 461 connected thereto.

Consequently, nuts and bolts 466, above the respective upright posts or stanchions 463, indicate that an assured method of assembly may include providing studs at the top of each stanchion 463, to extend through appropriately located holes, concentrically about the vertical axis through the upper platform 462, with the nuts being threaded upon the upper ends of the bolts 466 to complete assured aligned and balanced assembly of pressure vessel with relation to platforms 461, 462. As the connections are then thus made the pressure vessel 460 will, of course, have to be supported by a temporary, removable supporting or lifting means, from below.

Spaced from the right of the central uprights 465b are shown right uprights 465c, both uprights 465b, 465c, being taller than the left uprights 465a, to support a hopper support frame 468 for a materials hopper 470. A bottom flange of the hopper 470 has an upper fill valve 469 connected thereto, with a flexible conduit section 471 connected therebelow. Then a lower fill valve 472, is shown connected below the flexible conduit section 471, with a downspout 473 extending downwardly and to the left from the lower fill valve 472 for connection into the top of the pressure vessel 460.

A suitable spacer and centering nipple or cap may be provided on top of the pressure vessel 460, or centrally under the lower platform 461, or for both lower platform and pressure vessel, thus for room for any apparatus that may be disposed on the upper part of the pressure vessel 460, under the lower platform 461, such as discharge valve and purge valve and their valve operators, or relief values and the like. Illustrative of this feature, the uprights 465a, 465b, 465c, the stanchions 463, and the downspout 473 are shown broken. Also, the above enumerated apparatus may extend through suitable apertures in the lower platform 461, thus also permitting easier access for service from the lower platform 461, (or from the upper platform 462), as need be.

Noticeably in FIG. 12, there can be allowed ample room for all of the apparatus including activating air, and piping necessary to complete operation of the pressure vessel 460 for any of the various types of usages hereinabove described. Also, the panel box 474 is indicated as being readily accessible as to an operator standing at factory floor level.

As hereinabove described, two fill valves 469, 472, are required to hold the weight of the material in the hopper from being imposed for tare weight adjustment, correspondingly while as shown in FIG. 6, the fill valve 469, 472 should be connected through their valve operator conduits in manner that the upper fill valve 469 closes just a trifle sooner than the lower fill valve 472. The disclosure of FIG. 12 purposely omits showing complete apparatus and piping, since all necessary, and obvious, for the various types of pump usages that can be made from the platform and hopper dispositions of FIG. 12, have been fully disclosed, and in full detail hereinabove.

Material drying and conveying apparatus is shown in FIGS. 13–16, that comprises essentially the apparatus of a fluid flow pump 10, FIGS. 1–2, and additionally includes a load cell and apparatus for a drying stage preceding discharge. Thus the description of this form of the invention has employed the same reference numerals that correspond with elements of the fluid flow pump 10, hereinabove described with relation to FIGS. 1–2, and that correspond with elements of the load cell hereinabove described with relation to FIGS. 6–12. Thus new reference numerals are only assigned to the newly added apparatus for the drying stage or stages.

Thus a material container, housing, pump or activator 10 is shown in FIG. 13 comprised of a shell 11 including a cylindrical main body 11a with lower end closed by a bottom comprised of a spherical segment or lower closure 12b, the container being constructed after the general manner of conventional pressure vessels, and designed with safety factors, to withstand the highest pressures that may be developed therein.

The pressure vessel or container 10 seats upon a load cell 240 with its base 245 seated upon a frame 241 to which the fluid flow pump or vessel 10 is connected in manner corresponding with that shown in FIGS. 7–9. A gas permeable membrane or diaphragm 13, sloped at substantially 13°, as indicated, separates the container into an upper, or material plenum 15, and a lower, or gas plenum 16. The dome or top closure 12a has an inlet nipple or neck 17 connected centrally into the top 12a with a lower fill valve 18 being shown mounted thereon. The top flange of the fill valve 18 is shown as having the lower flange of a flexible nipple 19 connected thereto with the upper flange thereof being shown connected to an upper fill valve 18a, to be further described.

Above the upper fill valve 18a a connection nipple 19a upstands, and its top flange has the discharge flange 20 of the hopper 21 connected thereto. Correspondingly as shown in FIG. 6 for the hopper 200, the hopper 21 is supported by separate scaffolding 194. Also it should be noted that the lower and upper fill valves 18a, 18, are shown as operated by separate valve operators 23 and 23d, with the respective valve closing conduits 23c, 23f, being joined by a common instrument air conduit 23j, and with the respective valve opening conduits 23b, 23g, that let in instrument air behind the respective pistons 23a, 23e, are joined by a common instrument air conduit 23h; also a resiliently downwardly urged seated check valve 23k is shown in the conduit 23b. This insures that the lower fill valve 23 closes after the upper fill valve 23d, so that the weight of hopper and load does not have to be compensated by tare weight adjustment of the load cell 240; this adjustment having been hereinabove described.

A hot drying gas conduit 107 is shown connected into the lower end closure 12b of the shell or pressure vessel 11 below the high side of the membrane 13, and such hot drying gas inlet line 107 has a drying gas valve 26 therein, which is shown connected to be opened and closed by a valve operator 27, constructed and equipped as conventional valve operators hereinabove described. Also, a discharge outlet pipe 28 extends downwardly through the dome 12a to terminate in a pick-up end 28a disposed slightly above the low side of the gas permeable or air permeable membrane 13, a valve 29 is shown connecting this disclosure outlet pipe 28 with a discharge conduit 30. The discharge valve 29 is shown operated by a valve operator 33, which is indicated as being constructed, and as having connections thereto, in correspondence with the fill valve operator 23.

A purge line 34 extends between the discharge conduit 30, downstream of the discharge valve 29, to the material plenum or chamber 15 and has a purge valve 35 therein to control its opening and closing, a valve operator 36 being shown connected to the purge valve 35 for this purpose, such valve operator 36 being constructed, and having connections in correspondence with the fill valve operator 23. However, it may be pointed out, in this regard, that the purge valve 35 should be a normally open valve, whereas the fill valve 18, gas inlet valve 26, and discharge valve 29 are normally closed valves.

Additionally, the support body 37 for a safeguarding vibratory paddle 38, operative on the tuning fork principle, is shown connected into the cylindrical body 11a of the shell 11, the material sensitive paddle 38 being indicated in dotted lines in FIG. 13 as extending within the housing 10 near the top thereof, such paddle being operative to actuate the valve operator 23 to close the fill valve 18, as will be hereinbelow described.

An insulative cord 39, having therein the electrical conduits to the paddle 38, extends from the paddle support body 37 to a control box 40, to be hereinbelow described, and shown mounted on the exterior of the activator shell body 11a.

A vent valve 31 is shown connected into the dome 12a in FIG. 13 and operated by a valve operator 32 which is constructed, and has connections thereto, in correspondence with the fill valve operator 23. Also a solenoid operated blast air valve 104 is shown connected into the dome 12a oppositely of the vent air valve connection, with blast air, to be hereinbelow described, being supplied to the valve 104 through a blast air conduit 105. Additionally, a solenoid operated, transfer or moving air valve 106 is connected into the shell bottom 12b or gas plenum chamber 16, a conduit 25 being connected to supply moving air to the valve 106. Also, the shell segment 12b is shown having a drain valve 108 connected into the bottom thereof. Also, a conventional manhole 109 is shown provided in the side of the shell cylinder 11a.

The neck or nipple 17 which supports the fill valve 18, and by means of which the valve 18 is connected to communicate through the top of the dome 12a, extends downwardly into the shell or vessel 11 as indicated in FIG. 13. A series of equally angularly spaced apart, radially extending support rods or bars 110 have their inner ends connected to the nipple 17 and are connected at their outer ends to the inner surface of the shell 11a, as best seen in FIG. 14. At a spaced distance below the suspension bars 110 a baffle plate 111 extends across the shell 11a and has a central enlarged opening 112a therein into which is connected the lower end of a central perforated sleeve 112 of frusto-conical shape, the upper end of the sleeve 112 being affixed to the outer periphery of the lower end of the nipple 17.

A ring of round or eliptical holes or openings 113 is provided in the baffle plate 111, the holes being equally angularly spaced apart, and such holes receive therein the lower ends of perforate filter sleeves 114 to be affixed to the baffle plate 111. The filter sleeves 114 are of reduced cross-sectional area upwardly and the top of each sleeve 114 is connected upwardly to a respective suspension bar 110 as best indicated in FIG. 13. The filter sleeves 114 may be of woven metal cloth, perforate glass or perforate plastic of such porosity to admit the processing gas or air to pass therethrough while entraining or stopping the passage of the process material. A suitable handhole 115 is shown provided in FIG. 13 for access to the filter sleeves 114 and central sleeve 112. It should also be noted in the bottom view of FIG. 14 that the relative positions of the blast air inlet 104a and the vent air outlet 31a are discernable.

Also, in FIG. 13, respective conduits 33b, 36b, 27b, 32b, and 23j via 23b and 23f, connect into respective materials delivery, purge, hot drying gas, vent, and fill valve operator cylinders, respectively 33, 36, 27, 32, and 23 and 23d, under respective piston heads 33a, 36a, 27a, 32a, and 23a and 23e, and respective conduits 33c, 36c, 27c, 32c, and 23k, via 23e and 23g, connects into such cylinders above the respective piston heads therein. Thus, as shown in FIG. 13, conductor cords or sleeves 33d, 36d, 27d, 32d, and 23m for the respective conduits for the respective valve operator cylinders aforesaid, are provided to extend from the control or panel box 40, where conventional instrument air, as from the instrument air conduit 93, may pass through respective conventional solenoid actuated valves, not shown, as operated by the aforesaid solenoids 66 and 63, and solenoids 126 and 136 and 48, shown in FIG. 15, and to be hereinbelow described, these five solenoids admitting operative air, gas or fluid, respectively into the conduits 33b or 33c; into the conduits 36b or 36c; into the conduits 27b or 27c; into the conduits 32b or 32c; and into the conduits 23j, or 23k; selectively to open or close the aforesaid materials delivery valve 29, purge valve 35, hot drying gas valve 26, vent valve 32, and fill valves 18 and 18a.

As shown in FIG. 15, a light 49 is circuit parallel with the solenoid circuit 47, and thus the light 49 is on when the fill valve 18 is open; also a light 61 is in a circuit parallel with the solenoid circuit 59 which actuates the valve 106 which admits the material activating gas, and with the solenoid circuit 62. which closes the purge valve; and also a light 67 is in a circuit parallel with the solenoid circuit 65 which actuates the opening of the materials delivery valve 29. Additionally, a light 54 is shown in a circuit 53 which is completed when the latching relay 52 is actuated to close the contacts 56a while the pressure within the container is still high enough to maintain closed the contacts 51b of the pressure sensitive switch 50.

As shown in FIG. 15, a positive line 41 and a negative line 42 extend from a source of electrical power, the positive line 41 having three parallel lines 41a, 41b, and 41c branching therefrom with the line 41a serving when manual control is to be used as will be hereinbelow described with the line 41b serving as a neutral third positive conductor and with the line 41c serving as the positive conductor when automatic control is to be employed. A three-way switch, indicated generally by reference numeral 44, is provided to control the selection of automatic or manual control, as desired, and as shown, the switch 44 indicates that automatic control has been selected, the conductors 41b, 41c, thus being closed and the conductor 41a being open.

A conductor 45 extends from the conductor 41c, and a push-buttom switch 45a, is shown in FIG. 15, as closing circuit in this conductor, the conductor 45 continuing to a junction with two parallel circuits including the circuit 47 for a solenoid 48 which operates the fill valve operators 23, 23d in FIG. 26, and the circuit of an indicator light 49 which may be designated as a green light for illustrative purposes.

The conductor 45 continues beyond the parallel circuits 47, 49, as the conductor 45c and has contacts 51a therein of a double acting pressure actuated switch 50 with its contacts 51a being normally closed at atmospheric pressure and opening upon increase of pressure in the gas plenum 16. The conductor 45c continues from the contacts 51a to a junction with a conductor 45b having therein the normally closed relay contacts 56a of a latching relay 52, the conductor 45b terminating at its connection to the negative power line 42.

A parallel circuit 53 extends from the neutral or central positive conductor 41b, to the junction of the conductors 45c, 45b, such parallel circuit also including therein the contacts 51b of the aforesaid double acting pressure actuated switch 50. Such contacts 51b being normally open at atmospheric pressure and closing upon increase of pressure in the aforesaid gas plenum 16. The circuit 53 also has therein an indicating light 54, designated as a yellow light for indicating purposes, as will be hereinbelow described.

Another parallel circuit 55 from the positive conductor 41b has the pressure sensitive switch 46a therein which is closed by the pressure sensitive signal transmitted thereto through the conduit 287 from the load cell control chamber 276, FIG. 10, the circuit 55 also having in series therein the coil 52a of the latching relay 52. The circuit 55, as thus closed, energizes the latching relay coil 52a to open the normally closed relay contacts 56a to break the aforesaid parallel circuits 47, 49 and 55, and upon the solenoid circuit 47 being de-energized, the solenoid 48 retracts and moves the valve operators 13 and 13d to close the fill valves 18 and 18a, both valve operators and fill valves being shown in FIG. 13.

The latching relay 52 is of the well known type, which, when its coil 52a is energized, it actuates conventional switching means which opens the normally closed contacts 56a, and pulls closed the normally open contacts 56b in a parallel circuit 57 extending from the negative conductor 42, in manner that the latching relay mechanism latches against any movement except that which may be imparted to the switching means to pull open the normally open contacts 56b. This can only be effectuated by the energization of the latching relay coil 52b, to be hereinbelow described as to operation.

The apparatus for handling a material not requiring drying will be first described, for purposes of clarity, and with its operation understood, the apparatus for interjecting the drying processes will then be described, and the relationship to the activating, full discharging and purge discharging apparatus and steps set forth therewith.

The circuit 57, hereinabove referred to, has the aforesaid latching relay, normally open contacts 56b therein, and adjacent thereto, in direction of the positive conductor 41b, a manual throw switch 60 is connected into the circuit 57, so that when the switch 60 is manually or selectively disposed to connect the circuit 57 with a continuation circuit 57a, the apparatus is set to handle a material which does not require a drying process before delivery for subsequent handling. Thus the four circuits: 57b, and then 59, 61 and 62, to be hereinbelow described, are joined to the circuit 57a, the circuit 57b being continued by the circuit 57c to the positive conductor 41b.

From the junction of the circuits 57b, and 57c, a circuit 64a having a switch 64 therein, continues as the circuit 64b to the negative side junction of the aforesaid circuits 59, 61 and 62. A fixed time delay relay 58 of the thermal delay type, in the circuit 57b, operates for its time interval, when the circuit 57a is closed, and closes the switch 64 whereby the solenoid 59a in control box 40 releases air from the tube 127 to open the moving air inlet valve 106 whereby the circuit including the light 61, blue to indicate activation, is closed, and whereby the circuit 62 actuates the solenoid 63 to close the purge valve 35; see FIGS. 26, 27 and 28.

Also, a circuit 57d continues from the junction of the circuits 57b, 59, 61 and 62 with the circuit 57a, and branches into: a circuit 65 including the coil which operates a solenoid 66 which actuates the valve operator 33, shown in FIG. 1, to open and close the discharge valve 29; a circuit including a light 67 therein, which is designated as a red light, for purposes of illustration; and a circuit having a relay 68 therein; from the positive side junction of the circuits 65, 67 and 68, there extends a circuit 57e (having a normally open pressure actuated switch 69 therein, to be hereinbelow described), with its positive side connection being completed with the conductor 41c; and there also extends from such junction a circuit 57f having a pair of contacts 70 therein, operated by the relay 68, and terminating by connection with the neutral or positive conductor 41b. a pushbutton switch 71 is shown in FIG. 3 closing the circuit 41c adjacent its connection to the circuit 57e.

Additionally, a circuit 72b, 72a connects the positive or neutral conductor 41c with the negative power line or conductor 42; the circuit 72b having in series therein a pair of contacts 74, (operated by the relay 68 substantially simultaneously with its operation of the contacts 70 in the circuit 57f), and a pressure sensitive switch 73 which functions as will be hereinbelow described. Then, the circuit 72a, with which the circuit 72b connects, has therein the latching relay coil 52b which operates to break circuit closed by the hereinabove described relay contacts 56b.

The gas, as compressed air, which activates and transports the material which enters the container, shell, or pressure vessel 11, arrives from its source, as a compressor or pressure header 25h, as shown in FIG. 13, and enters conduit 25 to pass through a strainer 83 and a globe valve 84 on its way to being regulated as to the pressure at which it is to be supplied. Thus the gas is first measured by a high pressure gauge 85 in the top of a gauge pipe 85a which upstands from the main gas line 25 through which the strained gas passes on downstream, and to the transfer gas valve 106.

A smaller sized by-pass line 25a extends between the gauge pipe 85a and the aforesaid pressure regulating valve 86 in the main conduit 25, and has a pilot regulating valve or regulator 87 therein, thus to permit a finer and more responsive control of the pressurized gas on its way to the pressure vessel 11. A by-pass line 87a conveys the reduced pressure gas from the pilot regulator 87, and connects with an upstanding gauge pipe 88 above the main conduit 25, a low pressure gauge 89 being mounted on top of the gauge pipe 88 to indicate the lowered pressure of the gas.

A conduit 90 extends from the lower closure 12b to conduct pressurized gas from the gas plenum 16 to the control box 40, there to bear upon and cause actuation of the pressure sensitive switch 50, operative as hereinabove described, and to bear upon and cause actuation of pressure sensitive switches 69 and 73, to be further described as to operation hereinbelow.

The switch actuating gas, which must be taken from within the pressure vessel 11, enters the conduit 90 and passes through a strainer 91 therein, and on to the panel box 40, a gauge 92 being provided to indicate the pressure of the actuating gas as it passes downstream of the strainer 91 on its way to the panel box pressure sensitive switches, as aforesaid. The instrument air required by the pressure sensitive switches, as contradistinguished from the actuating air or gas, and any other air or gas required to actuate any of the apparatus, as that required to operate the valve operators shown in FIG. 13, may be brought to the panel box 40 through a conduit 93 for selective distribution.

Also, the power conductors 41, 42, from a source of electrical power, as a 60 cycle, 115 A.C. voltage source, may be brought to the panel box 40 through an insulated conductor cord 95. A conventional fuse 96 is provided in the positive power line 41, indicated as comprising the conventional fuse strip 96a, and in a parallel circuit therewith, the conventional resistance 96b and indicating light 96c.

The operation of the apparatus shown in FIGS. 13, 14, and 15, may be set forth in a sequence, and partially by way of reiteration, with the composite switch contacts 51a and the latching relay contacts 56a closed, the switch 45a may be manually closed whereby the solenoid 48 actuates its associated valve operators 23 and 23d to open the fill valves 18, 18a, for the material plenum 15 to receive material therein until the weight pressure signal responsive pressure sensitive switch 46a closes at which time the relay 52a of the latching relay is energized to break the latching relay contacts 56a being closed.

The switch arm 60 closes circuit with the circuit 57a, and the fixed time delay relay 58 is energized so that the switch 64 is closed and the solenoid 59 actuates its associated valve operator to open the activating air or gas valve 106 to let gas, such as compressed air, into the gas plenum 16 to pass through the membrane 13 and into the material plenum 15 to start pressurizing the vessel or activating the material to be transferred. Also, as this occurs, the circuit 62, having therein the switches 62a, 62b on either side of the solenoid windings 62, are disposed in circuit closed position. Thus the energized solenoid windings 62 actuate the solenoid 63 to actuate the valve operator 36 to close the purge valve 35. The entering gas thus pressurizes the vessel 10 and activates the material until that pressure is attained which will close the normally open pressure actuated switch 69 whereby the solenoid 65 is actuated to move its associated valve operator 33 to open the discharge valve 29. Also the relay 68 is energized to close the normally open switch 70 and the normally open switch 74.

Discharge then continues until the pressure dropped to open the pressure sensitive switch 69, then to close the pressure sensitive switch 73, thus completing circuit to the latching relay coil 52b which is energized to open the latching relay contacts 56a, thereby to close the latching relay contacts 56b whereby the windings of the discharge control solenoid 66, of the activating air control solenoid 59a, and of the purge control solenoid 63 are de-energized, so that discharge valve 29 and air supply valve 26 are closed and the purge valve 55 is opened. The vessel then purges itself until the pressure falls substantially to atmospheric to close switch contacts 51a and open switch contacts 51b, thus returning the apparatus to initial status.

On occasion it may be desirable to operate the filling and evacuation of the container 10, FIG. 13, by manual control of the sequence of steps, rather than automatically, as hereinabove described. For such occasion, it may be considered that the load cell signal transmitting conduit 287 may be closed. Then a circuit 101, FIG. 15 is provided, parallel with the circuit 45, to extend from the positive conductor 41a and to connect with the circuit 45 between the pushbutton 45a and the circuit junction 47, 49. Also, in this case there also serves the aforesaid circuit 76 from the circuit 41a to the junction of circuits 75, 75a, and having the pushbutton 77 therein; also, the circuit 102, parallel with the circuit 57e and connected thereinto between the pushbutton 71 and the normally open pressure sensitive switch 69; also, the positive power circuit 41a is extended to connect with the junction of the circuits 72a, 72b, and to have the pushbutton 103 therein. Manual operation may now proceed as hereinabove described.

Thus, this occurs after the purge valve 35 has been reopened by the latching relay contacts 56b, to permit the purging of the container by the residual pressure therein until such pressure drops to substantially atmospheric so that the pressure sensitive switch 50 is actuated to open the contacts 51b and close the contacts 41a, thereby breaking the circuit 53 which contains the light 54 therein.

The lights 49, 61, 67 and 54 may have selectively differently colored bulbs, as, respectively, green, blue, red and amber, thus to indicate, respectively, that filling, activating, discharging and purging are taking place. See earlier description.

Respective valve operators 23 and 23d, 27, 33, 32, and 36, FIG. 13 are shown used to operate the fill valves 18 and 18a, hot drying gas delivery valve 26, material delivery valve 29, vent valve 32 and purge valve 35; however, it is often not necessary, in the case of light duty installations, and/or in the case of the valves 26, 29, 31, 35, that special valve operators be required for their operation. In such cases the solenoids 60, 66 and 63, and the vent valves solenoid, to be hereinbelow described, may thus be connected directly to the respective valves 26, 29, 35, and 31 to effectuate their operation. In this regard, notice that no valve operator is shown in FIG. 13 for operating the activating gas, or material moving valve 106, described hereinabove as opened and closed by the energization and de-energization of the solenoid windings 59, FIG. 15, as aforesaid. However a valve operator could be used to carry out this function with instrument air from conduits leaving the panel box 40 via the tube 127 being employed in such valve operator, where the tubing connection 127 at the top of the valve 106, FIG. 13 would be representative of the connection of the valve operator piston rod to such valve 107.

The level probe 37, FIG. 13 is represented by its vibratory paddle 98 as being of the frequency sensitive type, with conductor cord 39 extending to the panel 40. In the diagram of FIG. 13, the reference numeral 37 is thus employed to represent a switch closed by paddle vibration stoppage by contact with filling material, the conductors 39 connecting the switch 37 in parallel with the weight sensitive switch 46a. This typical level probe (FIG. 3); as well as other types, may serve as a fail safe measure, also as alternatively functioning with, or as functioning in place of, the pressure sensitive switch 46a.

In order to carry out a preliminary drying of material preparatory to activating it and pressurizing it for discharge, as this invention entails, additional apparatus and circuitry is provided for use with the apparatus and circuitry hereinabove described. Such additional inventive circuitry and apparatus supports and controls the admission and cut off of drying air through the drying air valve 26, the venting of the container 10 during selective cycles through the vent valve 31, and the admission of cut off of filter cleaning blast air through the air blast valve 104, the valves 26, 31 and 104 being shown in relation to the container 10 in FIG. 13.

Thus the double pole, single throw switch 60, shown in FIG. 15, may be manually switched from closing circuit between the conductors 57 and 57a, as shown in FIG. 15, to the dotted line position to close circuit between the aforesaid conductor 57, and a conductor 116 from which a series or succession of parallel circuits extend to a conductor 118. The conduit or conductor 118 in turn connects with a conductor 64c which connects with the junction of the conductors 64a, 64b, hereinabove described, the conductor 64c in turn being connected to the neutral or positive side conductor 41b, as aforesaid. The circuit or conductor 64c has a double pole, single throw switch 119 therein which is mechanically closed by the closing of the fill valve 18, this operation being indicated diagrammatically in FIG. 15 by a heavy dotted line connecting the switch 119 and the solenoid 48 which operates the fill valve operator 23 shown in FIG. 13.

A timer 120 of the well known "Eagle" tyle is provided in a circuit between the conductors 116, 118, which is adjusted to run for a predetermined time, at the end of which time it closes a normally open switch 117 across the conductors 57a, 116, and opens a normally closed switch 121 in the conductor 118.

A motor 122, which actuates the timer 120, is in circuit parallel therewith, as shown in FIG. 15. Thus the motor 122 can be connected to run the timer 120 for the predetermined duration of the whole drying period. A light 123, which may be designated as a white light, is in circuit parallel with the timer circuit 120 and its motor circuit 122 to indicate that the drying process is in progress.

A solenoid winding circuit 124, in parallel with the circuits 120, 122, 123 has a normally closed switch 125 therein; the solenoid winding 124 actuating the aforesaid solenoid 126 which actuates the valve operator 27 to open the hot drying gas valve 26. Also a solenoid winding circuit 128, extends from the conductor 116 and includes a normally closed switch 135 therein, the circuit 128 terminating at a contact 130, to be hereinbelow described. The solenoid winding 128 when energized, actuates a solenoid 129, to release air in a tube 142 to permit the filter blast air valve 104 to open.

Also, a timer circuit 131 extends from the conductor 116 parallel to the circuit 128 and terminates at the contact 130, the timer 131 serving the purpose of timing the brief opening of the air blast valve 104 between intervals of drying, as will be hereinbelow described.

Additionally a timer circuit 132 from the conductor 116 includes the timer 132 therein and a normally closed switch 133 therein adjacent its connection to the conductor 118. Between the timer 132 and the normally closed switch 133, the pivot of a normally open switch 134 is connected into the circuit 132, which in closed position completes circuit to the contact or junction 130 of the circuits 128 and 131. The timer 132 serves the purpose of timing the drying interval between successive opening of the blast air valve 104, the drying air entering continuously through the valve 106 between those brief instances when the blast air valve 104 opens.

Also, the additional circuitry and apparatus comprised by the invention includes a solenoid winding circuit 136 between the conductors 116, 118, and also a relay circuit 137, parallel thereto. The circuit 136 actuates a solenoid 138 which in turn actuates the valve operator 32 which controls the opening and closing of the vent valve 31, shown in FIG. 13.

The Eagle timer 120 is set, as aforesaid, to run for the duration of the preselected and preset drying cycle and then "times out" to close the normally open switch 117 and to open the normally closed switch 121. The Eagle timer cycle is divided into a number of sub-cycles, during each of which the drying air is delivered for an interval and then for an instant the drying air is shut off and blast air enters the top 12a of the shell to blow reversely through the filters 114 and through the central filter 112 to blow any material grains or particles impinged on the inner surfaces thereof back into the material plenum 15. Thus, in each sub-cycle the drying air timer 132 times out to open the normally open switch 125 to break the solenoid circuit 124, whereby the solenoid 126 closes the drying air valve 26, the timer 132 at the same time closing the normally open switch 134 to start the blast air timer 131 and to close the blast air solenoid circuit 128, whereby the solenoid 129 opens the blast air valve 104.

The timer 131 then runs to time out to open the normally closed switch 135 to the solenoid winding 128 whereby the solenoid 129 opens the blast air valve 104 and opens the double pole, single throw or relay switch 133, thus breaking the circuit to both timers. Both the timer 131 and the timer 132 may now reset, the timer 131 taking power off the normally closed switch 135 to permit the solenoid circuit 128 to be restored and taking power off the relay switch 133, allowing it to open. Also, the timer 132 takes power off the normally open switch 134, permitting it to open, and takes power off the normally closed switch 125 in the solenoid winding circuit 124, allowing this normally closed switch 125 to close, whereby the solenoid 126 may open the drying air valve 26. With the timers 131 and 132 both reset, the drying air valve 26 is opened for its sub-cycle of drying air delivery, followed by discontinuation for filter air back blast, as aforesaid.

When the drying air-blast air sub-cycles have been repeated for a total amount of time equal to the time for which the Eagle or control timer 120 has been set, this timer times out, opening the switch 121 and closing the switch 117, as aforesaid. During the drying process the relay 137 has been energized to move the respective switches 62a, 62b in contact with the respective contacts 64d, 64e, thus keeping the winding 62 of the solenoid 63 energized whereby the solenoid 63 has held the valve operator 36 in purge valve closing position. At the end of the drying process the relay 137 is de-energized to switch the switches 62a, 62b into the position shown in FIG. 15, thus to complete the purge solenoid winding circuit 62 to the switch 64, which is closed to begin the activation and transfer of material steps, as hereinabove described, the purge valve 35 thereby remaining closed after the switch 64 is closed, until it opens to start the purge step.

The closing of the switch 117 throws the apparatus directly into the activation and transfer step, while breaking circuit to the apparatus functioning in the drying cycles, and this apparatus and circuitry remains inactive until the next closing of the fill valve 18 mechanically closes the shift switch 119. Then with the switch 117 closed, the apparatus immediately embarks into the steps of activating the material, discharging it, purges the vessel, and returning to initial conditions, as hereinabove described.

By a skillful combination of circuitry and apparatus the processing may be carried out with both uniformity and alacrity, and within the fineness of detail permitted by the many features through which adjustment may be made. The materials processed, for instance, may cover a wide range of pharmaceutical components, plastics, foods, and the like, which enter with various proportions of moisture therein. The physical form of the material handled may be granular, crystalline, or powdered, as examples, in micron size particles up to from 10 to 20 mesh. The diaphragm separating the gas and material plenums should best be of 200 mesh woven, stainless steel, or of porous ceramic. Fineness of the membrane may be controlled by employing successive layers thereof. As to the angle at which the membrane may be installed, this may be varied by virtue of the type of material used, and by the moisture content, and the slope may range from 5° to say 15°. Also, the filter requirements may vary, it having been found that filters which provide a total filtering area in 15 to 1 ratio to the bed area of material is a satisfactory ratio, but this ratio may vary, as say from 20 to 1 to 10 to 1.

Illustrative of the complicity of pump combinations that can be accomplished with structural arrangement of elements associated with suspension from load cell, as illustrated by FIG. 12, a fluid flow pump 460a is shown in FIG. 16, suspended by a load cell 240 and with elements of arrangement disclosed in FIG. 12 being assigned the same reference numerals in FIG. 16. The fluid flow pump 460a shown in FIG. 16, is represented as containing drying apparatus therein with all necessary operating apparatus in appropriate disposition. Correspondingly the salient features of arrangement for such a specialized type of machine are indicated, partially, diagrammatically, but as they affect adaption of the basic structural arrangements shown in FIG. 12.

As shown in FIG. 16, a valve controlled, hot drying air auxiliary line may be connected onto the discharge line 328a to admit hot drying air or gas, or blast gas at intervals to keep the material that otherwise would stack up in the discharge 328a, dried and in a degree of suspension.

As to circuitry, that shown generally in FIG. 15 may serve, as indicated. Thus in this view it is indicated in dotted lines that the unlatching or breaking of circuit by the first latching relay switch 562 may close a switch 233 to complete circuit to negative 42 in a circuit 232 that includes the agitator drive motor 321 therein. Such circuit 232 is indicated as having a manual or push button switch 230 therein on the positive side of the agitator motor 231. The disclosure of FIG. 16 is injected as demonstrative or special inventive combinations that evolve from the basic fluid flow pump, and its cycle, whereby changes, as demonstrated by FIG. 16, may be developed to cover the handling, processing and transfer onwardly of material, of various particle size, and for various industrial usages, A revolved blade type level probe 422, as shown in FIGS. 17–19, may also be used in place of the type of level probe shown in FIG. 3, or in place of any other types of level probes, including any to be hereinbelow described. In FIGS. 17–19, the housing 422c is shown as including an outer, primarily switch enclosing housing section 440, which has an externally threaded enlarged flange 440a designed for threaded engagement in, and to shoulder against the outer end of the housing section 441 for the aforesaid level probe motor 422g. The motor housing section 441 includes a reduced diameter, externally threaded portion 441a, on the side opposite the switch housing section 440, for engagement in the shell of a pressure vessel.

The motor 422g within the motor housing 441 therefor, is shown as having a positive terminal outlet 441c and a negative terminal 441d with an outlet fitting 441c being provided in the housing 441 through which conductors from both terminals may extend, and on through a common conductor cord. A switch box 422j for the micro-switch 422h is shown in FIG. 18 as mounted within the switch housing 440 by three mounting screws 440b, 440c and 440d, which also serve, within the switch box 422j as the positive post, common post and negative post, respectively, of the micro-switch housing 422j.

In FIG. 18 the switch member 422h, pivoted on the positive post 440b, is indicated as urged closed against the common post 440c as by a spring 422k, and in this position the circuit 422f, FIG. 19, is open. In the meantime circuit through the LPM motor from the conductor 422d on positive side, through the motor windings, not shown, to the conductor 422e on the negative side, is closed and the paddle or blade 422a is rotated by the motor 422g.

The spring member 422k has such relation to the speed of the shaft of the motor, that as long as the motor rotates the blade 422a, the swing micro or switch member 422h stays closed against the common post 440c. However, the micro-switch member 422h, incorporated with a conventional toggle action, should be able to kick loose from contact with the neutral post 440c, at the instant the blade or paddle 422a begins to stall or founder in its revolutions against material rising in the gas plenum 365. Thus the designed contraction of the spring 422k, as the motor shaft slows down, combined with the built-in toggle action also resulting in the micro-switch or swing member 422h, kicking over further to compress, or to let the spring 422k contract, results in the swing member 422h closing against the negative post 440d.

As has been set forth hereinabove, in pumps where level probe stoppage is designed as the main, and primary means for actuating fill valve closure, the load, or latching relay first coil 425a in the circuit 422f, is energized when level probe blade rotation is stopped by material, and circuit 422f, through switch member 422h, is completed to circuit 422f, therebelow, which contains the latching relay coil 425a, just adjacent to the negative power line 406.

In FIGS. 18 and 19, a light LG, light green, is in circuit extending from the common post 440c to ground, thus to stay on all the time the pressure vessel is filling, and to go off when the micro-switch member 422h shifts to the negative contact or post 440d. Also, in FIGS. 18 and 19, a light P, pink or purple, is in circuit extending from the negative side post 440d to ground, thus to stay off all the time the pressure vessel is filling, and to go on when the micro-switch member 422h shifts to the negative contact or post 440.

The diagram of FIG. 19 shows the wiring diagram to be identical with the circuitry described with relation to FIG. 18. Additionally the level probe 422c may be applied in relation to the environment to various pressure vessel structures as in place of the level probe usage indicated in FIGS. 1–3, inclusive. That is, the circuit 422d is indicated as being in parallel with the adjacent, hereinabove described circuits 430, 431, and 432, each of which extends between the positive side connected circuit 424a and the negative side power circuit 406, the circuit 430 containing the green fill light therein, the circuit 431 containing the vacuum blower starter therein, and the circuit 432 containing therein the solenoid windings for the solenoid that operates the four-way valve that directs instrument air to open the vacuum blower.

A form of level probe is shown in FIGS. 20 and 21 which requires less circuitry, and which may serve with bulk density of materials of a minimum of 15 pounds per cubic foot, minimum particle size of 20 mesh, with preferred 115 volt, 60 cycle, 15 amperes alternating current electricity. Such as air gap type level probe 442 is shown in FIG. 20 as comprising a bellows box housing 443 and a micro-switch housing 444. The micro-switch housing 444 includes an externally threaded, enlarged flange 444a which is designed for threaded engagement in, and to shoulder against the outer end of the bellows box housing 443. Oppositely the housing 443 has a reduced diameter boss 443a to shoulder against a vessel with which the level probe 442 is to be assembled, as at a predetermined elevation above the diaphragm corresponding with that elevation it is desired for the material to rise in the vessel. A still further reduced, externally threaded, hollow part 443b extends concentrically from the boss 443a and through a bore in the pressure vessel shell and included with the shell, a lock washer, not shown, may be installed about the part 443b to bear against the inner surface of the shell, with a nut 443c, threaded upon the threaded part 443b to complete assembly. A rigid tube 445a is shown extending inwardly into the vessel through the lowermost area of the opening through the part 443b, and a corresponding rigid tube 445b is shown extending inwardly through the uppermost area of the opening through the part 443b, together such tubes 445a, 445b, at a predetermined distance within the pressure vessel from the part 443b, one spaced above the other, enter into the outer end or face of a receiver 446, which may be termed an air gap providing block or probe.

Instrument air enters through a conduit 449, passed through suitable adapter fitting means 454, into the interior of the bellows box housing 443, and a reduced diameter flexible tubing 445c, which may extend as from a venturi tube or choke orifice provided within the adapter fitting means 454, is passed through the interior of the housing 443, and through a suitable bore therein, as through the boss 443a, to continue as the hereinabove described tube 445a. The receiver or probe block 446 is of modifed, inverted U-shape in construction, to form an outer leg 446a through which extends the outer end portion of the tube 445a, with a discharge nozzle shaped nose 445d projecting slightly into the air gap 447 provided between the probe block or receiver outer leg 446a and inner leg 446b.

The hereinabove upper disposed tube 445b extends through the receiver or probe block 446 and is recurved therein to project outwardly from the inner leg 446b into the air gap 447. The slight projection 445c of the tube 446b into the air gap is disposed directly oppositely, of, or in co-axial extension of the nozzle 445d. Noticeably this projection is concave, or could be slightly flared or streamlined better to receive high velocity air directed thereinto across the air gap 447 from the nose or nozzle 445d.

Within the housing 443 is disposed the bellows box 448 which is pressurized slightly above atmospheric pressure around the bellows 449, the inside of which is in communication with the tube 445b which passes sealably through the bellows box 448 prior to connection therewithin to the bellows, as aforesaid. The outer end of the box 448 has a bellows connected contact point 450a passed therethrough and through an inner wall of a micro-switch housing or bracket 451. Within the housing 451 the end of the bellows connected contact point 450a confronts a housing mounted contact point 450b that is mounted in manner to be positioned by the point 450a to close or let open a micro-switch, not shown, but carried by the bracket or housing 451.

The heads of three machine screws are seen on the forward or outer wall of the bracket or micro-switch housing 451, to serve as posts 452a, 452b, 452c, which serve, respectively, for positive conductor, common, and neutral (or negative) conductor connections. Two conductors designated 433a (positive), and 433 (neutral), are shown extending through a common outlet boss 443d, FIG. 20.

FIG. 21 shows diagrammatically the air gap type level probe with its several operative parts arranged in sequence of operation from the right to the left of the upper part of the diagram, and with the apparatus operative in association therewith shown in alignment therebelow.

Instrument air starts from an AIR SUPPLY, as a compressor, to pass through a strainer or filter F, and through a V Reg, to be fed into a pressure vessel to activate the material therein, and with part passing to an instrument air location or SOURCE, as through a small tubing to a panel box. From this SOURCE the instrument air, at pressure to operate the air gap level probe 442, passes through conduit 447 and tubing 445c, FIG. 20, not shown in FIG. 21, and passes out the air nozzle 445d at velocity to extend straight across the AIR GAP into the shaped inlet 445e of the RECEIVER (tube 445b through block 446). Thence the compressed air passes within the tube 445b, into the bellows box 448 and from the tube 445b enters the interior of the bellows 449. As long as the flow across the air gap (445d to 445c) is not interrupted, as should be the case during the greatest part of the fill cycle, the force of the air in the bellows 449 is enough to keep it urged outwardly, thus to urge the stop bar 449a, across the outer end of the bellows 449, against the inner face of the outer wall of the bellows box 448.

As the bellows connected, hollow contact point or plunger rod 450a, also connected to the stop bar 449a, is thus urged to maximum outwardly extent, it forces the micro-switch bracket or housing mounted, insulated contact point or plunger rod 450b to urge the arm 453a of the micro-switch 453, pivoted on the neutral or negative post 452c, to maximum outwardly extents. At such maximum outwardly extent the switch arm 453a closes contact with the positive contact post 452a and circuit is completed, as from a positive side conductor 424a, through the post 452a, switch arm 453a, post 452c, circuit 433 containing solenoid windings for operating fill valve opening valve operator 373, and on to the negative power line circuit 406. Consequently by this arrangement, the closing of circuit to open the fill valve can take place by level probe actuation. Alternately fill valve closure may be independent of level probe actuation, or in parallel therewith, where these operations start in parallel by the closing of the positive side conductor circuit 424a by the pressure sensitive switch 428, as the purge cycle ends.

Now, as the material rises in the materials plenum of the pressure vessel, if in size above the minimum particle size necessary to interrupt the AIR GAP, the intensity of the air blast across the AIR GAP that enters the inlet 445e into the tube or passage 445b will be diminished so that the pressure within the bellows 449 drops off, while the air pressure upon the exterior of the bellows within the bellows box 448 remains unaffected. As a consequence the bellows is contracted, so the contact point or plunger 450a may retract. The bellows 449 when under the uninterrupted blast of AIR GAP crossing air, has urged the switch arm 453a to close circuit against the positive contact post 452a, and against the pull of a spring 453b. Then, as the hollow plunger 450a retracts, the plunger 450b at first follows it inwardly, as the spring draws the arm 453a out of contact with the positive post 452a until the switch arm 453a contacts the common post 452b as a stop collar 453 c on the plunger 450b contacts the inner surface of the wall of the switch housing 453.

As the circuit 433a, 433, is thus broken, the solenoid windings 433 are de-energized to switch the four-way valve handle 90° to the right in FIG. 21, thus to place instrument air conduit 408b in communication with the conduit 373c, to the outer end of cylinder of the fill valve operator 373, thus to close the FILL VALVE. The fill valve operator cylinder, under the pistion 373a, can evacuate through the conduit 373b and exhaust through the FOUR-WAY VALVE. Note that in regard to FOUR-WAY VALVE operation, a symbolical designation indicates that the solenoid armature for the solenoid windings 433 is operatively connected to the handle of the FOUR-WAY VALVE.

A feature to be noted in FIG. 21 is an O-ring seal 448a, at the inner end of the bellows block 448, around the receiver or air gap air conduit 445b, thus to keep the air within the bellows box 448 from leaking out, whereby the bellows 449 remains under a constant predetermined pressure above atmospheric. It is also a feature for observation that the contact point or plunger 450a is hollow and communicates with the interior of the bellows 449, and that when the bellows contracts and the outer end of the plunger 450a disengages contact with the plunger 450b, the bellows 449 may purge itself of any impurities brought in with the air that has first blown across the material first rising into the AIR GAP.

It is pointed out, that this type of level probe, which is generally subject to usage under conditions set forth hereinabove, but not limited to such usages, may be employed for fail safe or safe guarding fill valve closure, as well as for the primary purpose of closing the fill valve.

Also, returning now to the basic circuitry of FIG. 2, as modified for better wiring practice by shifting the latching relay coils and switches toward the "hot" or positive side of the circuitry without in any way changing function, various minor modifications of wiring may be made, whereon the demands of usage may call for a change in the means or factor controlling any special cyclic step in the basic fluid flow pump cycle, or in any of the more involved cycles which include the fluid flow pump basic cyclic steps.

Considering FIG. 22, a timer circuit 475 is shown in parallel with the circuit 57a, conventionally having a switch 64, closed by timer after the latching relay 52 shifts right at the end of the filling and fill valve closing cycle. This circuit 475 is indicated as closing a switch 476 at a predetermined time after the activating air valve opening is actuated by energization of the solenoid windings 59, thus the switch takes the place of the pressure sensitive switch 69, FIG. 2, in circuit 57e, 57d, and actuates the opening of the discharge valve by energizing the solenoid windings 65 to actuate the opening of the discharge valve, not as a function of pressure, but as a FUNCTION OF TIME, controlling the period of activation.

Now considering FIG. 23, the switch 73 is circuit 72b (that closes when the pressure in the pressure vessel, under discharge, drops to say 18 p.s.i., to introduce the purge cycle), is shown as having, in circuit 72b, a switch 477 substituted therefor that is closed by actuation of a timer circuit 478 in series with the switch 70 in the circuit 52f, and set operative at the same time the solenoid winding 65 is energized to actuate opening of the discharge. Thus by this means the discharge cycle duration is controlled, not as a function of pressure, but as a FUNCTION OF TIME.

Referring now to FIG. 24, the opening of the fill valve, at the end of the purge cycle, is shown obtained by the injection of a timer circuit 479 in the circuit 45b which contains the first latching relay switch 56a therein which is closed when the latching relay 52 shifts right, beginning the purge cycle. At this point the pressure sensitive switch 51b closes as the pressure vessel pressure has fallen, say below 18 p.s.i., and circuit is completed from positive to negative side, by way of circuit 45a, 45b, with the re-latched relay switch 56a and the timer circuit 479 therein, and thence via circuit 55, with the now closed pressure switch 51 and purge light 54 therein, to the negative power line circuit 42. The timer circuit 479 thus can be set to time out before the purge light circuit switch 51b opens, at say 0.5 p.s.i pressure vessel pressure, and thus closes a switch 480, (substituted in the circuit 45c for the pressur sensitive switch 51a), to carry circuit to parallel circuits, one including the solenoid windings 47 that actuate the closing of the fill valve. Thus the closing of the fill valve can be controlled, not as a function of pressure (by switch 51a), but as a FUNCTION OF TIME.

In FIG. 25 an arrangement is shown whereby the normally open pressure sensitive switch 69 that closes the circuit 57e, 57d, to start the discharge cycle, is replaced by a pressure sensitive switch 481 operative by a pressure fluid signal from the control chamber of a load cell 240. The conduit 287 that transmits the signal thus extends from the load cell to the panel box, where the control circuitry is located. The pressure switch 481 is set to close responsive to the intensity of a signal that reflects full batch weight plus the additional small fraction of weight above batch weight that is representative of the weight of air or gas that is required to pressurize the batch weight for discharge. The closure of the circuit 57e, 481, 57d, results in the energization of the solenoid windings 65 that actuates the opening of the discharge valve. As occurs conventionally, the control or latching in relay 68 latches in the discharge cycle by closing the switch 70 in the circuit 57f, so that when the intensity of the signal in the conduit 287 drops off as discharge begins, the discharge valve remains opened, as aforesaid. Thus the discharge cycle may be controlled, not as a function of pressure, but as a FUNCTION OF WEIGHT.

Also, the fluid pressure signal responsive to net weight effective in a load cell 240 may be employed, as shown in FIG. 26, to let a pressure sensitive switch 482, (that is substituted in place of the pressure sensitive switch 73, shown in FIG. 2), close as the weight of load cell affecting material and activating air drops under discharge to a predetermined amount. As the switch 482 closes to close circuit 72b, 72a, (the switch 74 having previously been closed by the control or latching in relay 68), the second latching relay coil 52b is energized to open the latching switch 56b, whereby the discharge and activating air valve close, and the purge valve opens. Thus the discharge cycle, with the circuitry just disclosed, is not controlled as a function of pressure, but as a FUNCTION OF WEIGHT.

In FIG. 27, a load cell 240 is shown with conduit 287 extending to the position of a pressure sensitive switch 483 that takes the place of the normally closed pressure sensitive switch 51a, that opens after the fill cycle and stays open until the pressure in the pressure vessel drops to say 0.5 p.s.i., or to substantially atmospheric pressure at the end of the purge cycle. The intensity of the pressure fluid signal from the load cell control chamber bearing against the pressure sensitive switch 483, diminishes during the discharge and purge cycles. When the second or left latching relay coil 52b has been energized at the start of the purge cycle, to shift right and unlatch the left or second latching relay switch 56b, the first or right latching relay switch 56a has been latched, so during the purge cycle circuit has been completed through the circuit 45a, 45b, and 55, (with switch 51b closed at pressures above say 0.5 p.s.i. and purge light 54 therein) to the negative main power line circuit 42. Then, at the end of the purge cycle, as the pressure in the pressure vessel drops to say 0.5 p.s.i. or substantially atmospheric, the intensity of the weight responsive pressure fluid signal imparted to the newly substituted, pressure sensitive switch 483, diminishes, as the batch load is substantially all transferred on down the discharge line. Thus the switch 483 is permitted to close whereby circuit is completed through the solenoid windings 46 to actuate the opening of the fill valve. Consequently by this substitution, the opening of the fill valve cannot be said to result as a function of pressure, but as a FUNCTION OF WEIGHT.

As indicated in FIG. 27, a branch conduit 287a may extend from a tee 287b in the load cell signal conduit 287, to the switch 46a in the circuit 55a that includes the latching relay first or right coil 52a that is energized at the end of the fill cycle. Thus this switch may be converted from a switch 46a that closes at the end of a time cycle as originally indicated in FIG. 2, to a switch 482 that closes when the intensity of the load cell weight signal builds up to that commensurate with the predetermined batch weight that is to be deposited within the pressure vessel before the fill valve is closed. By this means the closing of the fill valve can be said to be converted to a closure effected not as a function of time, but to a closure effected as a FUNCTION OF WEIGHT.

FIG. 28 is a circuit diagram indicative of the use of the valve operator 23, FIG. 1, as a means of closing circuit resulting in opening the activating valve 26 assuredly not before full closure of the fill valve 18. This feature has been hereinabove described as for instance, as applicable to the closure of the vacuum filled pump fill valve, FIGS. 19 and 20, but this feature can be employed to close circuit leading to the opening of the compressed air or activating gas inlet valve in any form of fluid flow pump structure. In the particular form shown in FIG. 37 it is indicated that a delay may be desired, even after the fill valve has been fully closed.

As shown in FIG. 28, the piston rod for the piston 23a of the valve operator 23 that closes the fill valve, is shown as having a forward extension 484 thereon that passes sealably through the outer end of the valve operator cylinder. Outwardly of the outer end of the cylinder, an insulative closure cam 485 is attached to piston rod extension 484 in a precalculated location. Thus, when the piston rod extension 484 is in fill valve closed position, the cam 485 will have urged the switch arm 486 to close a circuit 487 that is shown in FIG. 28 as including a timer 488 in series therein. In this case the circuit 487 is in parallel with a circuit 57a, 59, FIG. 2, which includes the timer actuated switch 64 therein, and the solenoid windings 59 of the solenoid 60 which actuates the opening of the compressed air or gas inlet or activating valve 26, FIG. 1. Optionally, the limit switch LSI may be in series circuit with the solenoid windings 59, as indicated in dotted lines in FIG. 2, such arrangement being employed when it may not be desired to impose a further time delay after fill valve closure, before actuating the opening of the air valve 26. This feature is indicated in FIG. 28 by dotted lines that would place the limit switch LSI in series with the second latching switch 56b of the latching relay 52, such switch 56b being closed by operation of the first latching relay coil 52a at the end of the fill cycle. Under any arrangement the assurance that the fill valve is fully closed before actuation of the air or activating valve opening is first a FUNCTION OF LIMIT SWITCH POSITION AT FILL VALVE CLOSURE.

Referring finally to FIG. 29, a normally open switch 490, which may be of the vibrated paddle, air gap, revolved blade or any other type of level probe types, is shown in the circuit 55a in series with the first relay coil 52a of the latching relay 52. Thus when the level of material in any type of fluid flow pump reaches level probe or sensor level during the fill cycle, as the level probe means of sensing is interrupted by material, the switch 490 closes to close the circuit 55a.

Upon closure of the circuit 55a the first latching relay coil 52a is energized to unlatch, open or break open the circuit 45b containing the first or right latching relay latch switch 56a, thus to break circuit through the solenoid windings 47 which, when deenergized, actuate the closing of the fill valve 18. When the level probe is relied upon solely to cause fill valve closure, the arrangement is as indicated in the circuit 55a, FIG. 28. If a level probe is to serve as an alternative feature, or as a fail safe or safeguarding feature for assuring fill valve closure, then a circuit 55b in parallel with the level probe, may contain another means of setting in motion fill valve closure may be employed, as the switch 46a closed by the timing out of the timer 46, FIG. 2.

The improvements claimed are all predicated on the original fluid flow pump apparatus and cycle circuitry, with the invention herein disclosed being predicated on various novel re-arrangements of circuitry, especially the service of a new load cell in various combinations of usage, with the load cell also being claimed per se as a sub-combination invention. Especially the inventions disclose a unique method and apparatus for suspending various modifications of the basic fluid flow pump upon a load cell whereby access to all associated parts is more readily obtained. The application is completed by the appended claims, not submitted in undue multiplicity, but to cover the various patentably distinct combinations entailed is this comprehensive disclosure of a wide range of improvements.

I claim:

1. Material transporting apparatus comprising a pressure vessel including a gas permeable diaphragm bridging the lower part of said vessel above the bottom thereof and dividing it into a material plenum thereabove and a gas plenum therebelow, a fill valve controlled inlet conduit to admit flowable material through the top of said vessel into said material plenum to upstand from said diaphragm, vacuum valve means controlling vacuum line communication between the pressure vessel below the diaphragm and the suction side of a vacuum pump, thus to apply vacuum pull through said diaphragm to draw in material from a supply source through an open fill valve in said pressure vessel into said material plenum, air valve means communicating into said pressure vessel below said diaphragm to break the vacuum most briefly at briefly spaced apart intervals, a valve controlled, pressurized gas conduit into said gas plenum, a discharge valve controlled discharge conduit from said plenum, a purge valve controlled by-pass conduit with purge valve disposed in communication with the upper part of said material plenum and to connect into said discharge conduit downstream of said discharge valve, automatically operable means including circuitry sequentially operable to open said fill valve, to open said vacuum valve means, interruptedly to open said air valve means, to close said fill valve means, and said purge valve, also said vacuum valve means, and said air valve means, to open said pressurized gas valve, to open said discharge valve whereby gas pressurized materials are discharged through said discharge conduit, then to start a following handling of a batch of material said circuitry being operable to close said discharge valve, and to open said purge valve, later to open said fill valve and said vacuum valve means and said air valve means.

2. Material transporting apparatus as claimed in claim 1, in which said gas plenum is divided into at least two sections, and in which said vacuum valve means and said air valve means each include a respective valve communicating with a respective section, and in which said circuitry includes time delay relay means controlling respective vacuum valve opening and closing and air valve interruption.

3. Material transporting apparatus as claimed in claim 1, in which said automatically operable means includes a valve operator for operating said fill valve, and in which said circuitry includes at least one of a timer means and a limit switch to actuate the opening of said pressurized gas conduit.

4. Material transporting apparatus as claimed in claim 1, in which said circuitry includes level probe means immobilized by material interruption of at least one of vibration of a frequency sensitive paddle, the passage of pressurized fluid across an air gap, and the revolution of a revolved blade.

5. Material transporting means as claimed in claim 1, in which said fill valve is closed by at least one of a signal emanated by a load cell, a circuitry included manometer switch, and a timer means.

6. Material transporting means as claimed in claim 1, in which said circuitry provides at least one of timer means and a limit switch closed upon fill valve closure, to actuate the opening of said gas conduit valve.

7. Material transporting means as claimed in claim 1, in which said fill valve controlled, inlet conduit is subjected to the pull vacuum downwardly through said perforate diaphragm to draw fill material into said pressure vessel, and in which the pull of vacuum is broken at intervals lasting only a fraction of vacuum pull interval.

8. Material transporting apparatus as claimed in claim 1, in which said fill valve is closed by at least one of a vibrated paddle, rotated paddle, and air gap level probe interruption.

9. Material transporting apparatus as claimed in claim 1, in which said fill valve is closed by at least one of a vibrated paddle, rotated paddle, and air gap level probe interruption.

* * * * *